United States Patent
Wakayama

(10) Patent No.: US 11,614,750 B2
(45) Date of Patent: Mar. 28, 2023

(54) SELF-PROPELLED DEVICE, SELF-PROPELLING METHOD, AND RECORDING MEDIUM

(71) Applicant: NEC CORPORATION, Tokyo (JP)

(72) Inventor: Hisaya Wakayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 16/978,343

(22) PCT Filed: Mar. 28, 2018

(86) PCT No.: PCT/JP2018/012930
§ 371 (c)(1),
(2) Date: Sep. 4, 2020

(87) PCT Pub. No.: WO2019/186815
PCT Pub. Date: Oct. 3, 2019

(65) Prior Publication Data
US 2021/0004023 A1 Jan. 7, 2021

(51) Int. Cl.
*G05D 1/02* (2020.01)
*G01C 21/34* (2006.01)
(Continued)

(52) U.S. Cl.
CPC ....... *G05D 1/0289* (2013.01); *G01C 21/3407* (2013.01); *G01C 21/3453* (2013.01);
(Continued)

(58) Field of Classification Search
CPC .................. G05D 1/00; G05D 1/0088; G05D 1/0287–0297; G08G 1/00;
(Continued)

(56) References Cited

U.S. PATENT DOCUMENTS 4,679,147 A * 7/1987 Tsujii ................. G01C 21/3667
73/178 R
6,269,298 B1 * 7/2001 Seto ......................... B60T 7/22
701/96
(Continued)

FOREIGN PATENT DOCUMENTS

JP 5-073798 A 3/1993
JP 2006-163615 A1 6/2006
(Continued)

OTHER PUBLICATIONS

Ishimaru Hiroyuki—English description of JP-2016128997-A via Espacenet Patent Translate, retrieved Jan. 14, 2022. (Year: 2022).*
(Continued)

*Primary Examiner* — Jeffrey C Boomer
*Assistant Examiner* — Paul Allen
(74) *Attorney, Agent, or Firm* — Sughrue Mion, PLLC

(57) ABSTRACT

A self-propelled device includes a host device movement vector acquisition unit that is configured to acquire a host device movement vector including a movement speed of the self-propelled device and a distance information acquisition unit that is configured to acquire nearby device distance information including a distance and a direction to the self-propelled device for each of nearby devices located near the self-propelled device. The self-propelled device further includes a nearby device movement vector acquisition unit that is configured to acquire a nearby device movement vector including a movement speed and a movement direction of each of the nearby devices for each of the nearby devices and a determination unit that is configured to determine whether a group movement is possible or not for each of the nearby devices based on the nearby device distance information, the host device movement vector and the nearby device movement vector.

10 Claims, 18 Drawing Sheets

(51) Int. Cl.
*G08G 1/16* (2006.01)
*G01C 21/20* (2006.01)

(52) U.S. Cl.
CPC ......... *G05D 1/0214* (2013.01); *G05D 1/0291* (2013.01); *G08G 1/166* (2013.01); *G01C 21/206* (2013.01)

(58) Field of Classification Search
CPC ....... G08G 1/161–163; G08G 1/20–22; G08G 1/166; B60W 60/00; B60K 31/00; B60K 2310/00; G01C 21/00; G01C 21/3407; G01C 21/3453; G01C 21/206
USPC .................................................... 701/23–28
See application file for complete search history.

(56) References Cited

U.S. PATENT DOCUMENTS

| | | | |
|---|---|---|---|
| 2007/0078601 A1* | 4/2007 | Nakano | G01S 19/51 340/436 |
| 2011/0313740 A1* | 12/2011 | Ikeda | G05B 17/02 703/2 |
| 2016/0267796 A1* | 9/2016 | Hiroma | G08G 1/166 |
| 2017/0344023 A1* | 11/2017 | Laubinger | B60W 30/165 |
| 2018/0136655 A1* | 5/2018 | Kim | H04W 4/024 |
| 2018/0194352 A1* | 7/2018 | Avedisov | G08G 1/0962 |
| 2019/0164423 A1* | 5/2019 | Bai | G08G 1/096791 |

FOREIGN PATENT DOCUMENTS

| | | | |
|---|---|---|---|
| JP | 2007-176355 A | | 7/2007 |
| JP | 2008-003675 A | | 1/2008 |
| JP | 2008-130059 A | | 6/2008 |
| JP | 2011-063189 A | | 3/2011 |
| JP | 2011-141663 A | | 7/2011 |
| JP | 2014-211851 A | | 11/2014 |
| JP | 2015-022419 A | | 2/2015 |
| JP | 2016128997 A | * | 7/2016 |
| JP | 2016-200931 A | | 12/2016 |
| JP | 6067633 B2 | | 1/2017 |
| WO | 2014/092628 A1 | | 6/2014 |
| WO | 2016/143113 A1 | | 9/2016 |
| WO | 2017/210200 A1 | | 12/2017 |

OTHER PUBLICATIONS

Peter R Wurman et al., "Coordinating hundreds of cooperative, autonomous vehicles in warehouses", AI Magazine, 2008, pp. 11-20, vol. 29, No. 1.
International search report for PCT/JP2018/012930 dated Jun. 26, 2018.
Japanese Office Action for JP Application No. 2020-508652 dated Nov. 24, 2021 with English Translation.
Japanese Office Action for JP Application No. 2020-508652 dated Apr. 26, 2022 with English Translation.
Japanese Office Action for JP Application No. 2020-508652 dated Nov. 8, 2022 with English Translation.

* cited by examiner

FIG. 5

| MOVEMENT SPEED |
|---|
| 1.25m/s |

FIG. 6

| NEARBY DEVICE | DISTANCE INFORMATION | | MOVEMENT VECTOR | |
|---|---|---|---|---|
| | DISTANCE | DIRECTION | MOVEMENT SPEED | DIRECTION |
| 10b | 1.80m | 15° | 1.00m/s | 30° |
| 10c | 1.30m | -22° | 1.00m/s | 30° |
| 10d | 2.00m | 0° | 1.00m/s | 30° |

FIG. 7

| NEARBY DEVICE | DISTANCE | MOVEMENT SPEED | MOVEMENT DIRECTION | DETERMINATION RESULT |
|---|---|---|---|---|
| 10b | × | ○ | ○ | × |
| 10c | ○ | ○ | ○ | ○ |
| 10d | × | ○ | ○ | × |

| MOVEMENT SPEED | MOVEMENT DESTINATION | |
|---|---|---|
| | DISTANCE | DIRECTION |
| 1.00m/s | 60m | −10° |

| NEARBY DEVICE | DISTANCE INFORMATION | | MOVEMENT VECTOR | | GROUP MOVEMENT DETERMINATION (DEGREE OF DEVIATION) | | |
|---|---|---|---|---|---|---|---|
| | DISTANCE | DIRECTION | MOVEMENT SPEED | DIRECTION | DEGREE OF DEVIATION | THRESHOLD | DETERMINATION |
| 10b | 1.00m | 0° | 1.00m/s | 0° | 10.5° | 12.7° | ○ |
| 10c | 0.50m | −90° | 1.00m/s | 0° | 10.5° | 12.7° | ○ |
| 10d | 1.12m | −12° | 1.00m/s | 0° | 10.5° | 12.7° | ○ |

FIG. 17

| MOVEMENT SPEED | MOVEMENT DESTINATION | |
|---|---|---|
| | DISTANCE | DIRECTION |
| 1.00m/s | 30m | -20° |

FIG. 18

| NEARBY DEVICE | DISTANCE INFORMATION | | MOVEMENT VECTOR | | GROUP MOVEMENT DETERMINATION (DEGREE OF DEVIATION) | | |
|---|---|---|---|---|---|---|---|
| | DISTANCE | DIRECTION | MOVEMENT SPEED | DIRECTION | DEGREE OF DEVIATION | THRESHOLD | DETERMINATION |
| 10b | 1.00m | 0° | 1.00m/s | 0° | 22.1° | 12.7° | × |
| 10c | 0.50m | -90° | 1.00m/s | 0° | 22.1° | 12.7° | × |
| 10d | 1.12m | -12° | 1.00m/s | 0° | 22.1° | 12.7° | × | ary dev# SELF-PROPELLED DEVICE, SELF-PROPELLING METHOD, AND RECORDING MEDIUM

CROSS-REFERENCE TO RELATED APPLICATIONS

This application is a National Stage of International Application No. PCT/JP2018/012930 filed Mar. 28, 2018.

TECHNICAL FIELD

The present invention relates to a self-propelled device, a self-propelling method, and a recording medium.

BACKGROUND ART

In recent years, the introduction of self-propelled devices such as, for example, an automatic guided vehicle (AGV) has progressed with the development of information technology (IT) of workplaces such as factories and warehouses. With the introduction of AGVs, commodities and parts can be transported without troubling humans, and the same amount of work as before their introduction can be carried out with a smaller number of workers.

In the introduction of AGVs, one problem is how safely and efficiently the AGVs can be operated. In view of safety, for example, Patent Document 1 discloses an AGV that, focusing the movement of individual AGVs, makes a range of detection of obstacles variable in accordance with traveling speed, and decelerates or stops a host vehicle when obstacles are detected within the range. On the other hand, in view of efficiency, for example, Non-Patent Document 1 and Patent Document 2 disclose inventory management systems that make it possible to respond to an order more quickly by efficiently operating an AGV according to an instruction from a management module.

PRIOR ART DOCUMENTS

Patent Documents

[Patent Document 1]
Japanese Unexamined Patent Application, First Publication No. 2011-141663
[Patent Document 2]
Japanese Patent No. 6067633

Non-Patent Document

[Non-Patent Document 1]
Peter R Wurman, Raffaello D'Andrea, Mick Mountz, "Coordinating hundreds of cooperative, autonomous vehicles in warehouses," AI Magazine vol. 29 no. 1 p. 9, 2008

SUMMARY OF THE INVENTION

Problem to be Solved by the Invention

In all the techniques disclosed in Patent Document 1, Patent Document 2, and Non-Patent Document 1 mentioned above, the automatic guided vehicles operate inefficiently in moving to desired positions when they are overcrowded within a certain range. In the technique disclosed in Patent Document 1, since the range of detection of obstacles is extended in accordance with movement speed, it is not possible to operate under the influence of proximity sensors in an overcrowded state. Further, it is necessary to operate the automatic guided vehicles step by step in order to create a space enough to exceed the range of detection. In addition, in the techniques disclosed in Non-Patent Document 1 and Patent Document 2, efficiency in allocation of tasks is taken into consideration, but configurations and operations for efficiently operating a plurality of automatic guided vehicles simultaneously are not disclosed.

In this manner, in the techniques disclosed in Patent Document 1, Patent Document 2, and Non-Patent Document 1 mentioned above, self-propelled device may not be efficiently operated relative to a nearby device in a case where a plurality of automatic guided vehicles are overcrowded within a certain range, or the like.

This invention is contrived in view of the above problems, and an object thereof is to provide a self-propelled device, a self-propulsion system, and a recording medium that make it possible to efficiently operate a self-propelled device relative to a nearby device.

Means for Solving the Problem

According to a first example aspect, there is provided a self-propelled device including: a host device movement vector acquisition means that is configured to acquire a host device movement vector including a movement speed of the self-propelled device; a distance information acquisition means that is configured to acquire nearby device distance information including a distance and a direction to the self-propelled device for each of nearby devices located near the self-propelled device; a nearby device movement vector acquisition means that is configured to acquire a nearby device movement vector including a movement speed and a movement direction of each of the nearby devices for each of the nearby devices; and a determination means that is configured to determine whether a group movement is possible or not for each of the nearby devices based on the nearby device distance information, the host device movement vector and the nearby device movement vector.

According to a second example aspect, there is provided a self-propelling method including: a step of acquiring a host device movement vector including a movement speed of a self-propelled device; a step of acquiring nearby device distance information including a distance and a direction to the self-propelled device for each of nearby devices located near the self-propelled device; a step of acquiring a nearby device movement vector including a movement speed and a movement direction of each of the nearby devices for each of the nearby devices; and a step of determining whether a group movement is possible or not for each of the nearby devices based on the nearby device distance information, the host device movement vector and the nearby device movement vector.

According to a third example aspect, there is provided a recording medium having a program recorded therein, the program causing a computer to execute: a step of acquiring a host device movement vector including a movement speed of a self-propelled device; a step of acquiring nearby device distance information including a distance and a direction to the self-propelled device for each of nearby devices located near the self-propelled device; a step of acquiring a nearby device movement vector including a movement speed and a movement direction of each of the nearby devices for each of the nearby devices; and a step of determining whether a group movement is possible or not for each of the nearby devices based on the nearby device distance information, the host device movement vector and the nearby device movement vector.

Effect of the Invention

According to the present invention, it is possible to efficiently operate a self-propelled device relative to a nearby device.

BRIEF DESCRIPTION OF THE DRAWINGS

FIG. 5 is a diagram illustrating an example of a host device movement vector in the second example embodiment.

FIG. 6 is a diagram illustrating an example of nearby device distance information acquired by the self-propelled device and a nearby device movement vector in the second example embodiment.

FIG. 7 is a diagram illustrating an example of operation results of a determination unit of the self-propelled device in the second example embodiment.

FIG. 17 is a diagram illustrating an example of movement destination distance information of the self-propelled device in the situation shown in FIG. 16.

FIG. 18 is a diagram illustrating an example of the degree of deviation and determination results of the self-propelled device in the situation shown in FIG. 16.

EXAMPLE EMBODIMENT

Hereinafter, example embodiments according to the present invention will be described with reference to the accompanying drawings. Meanwhile, the drawings and specific configurations used in each example embodiment should not be used for the interpretation of the invention.

First Example Embodiment

A self-propelled device 10 of a first example embodiment will be described with reference to FIG. 1.

Figure 1:
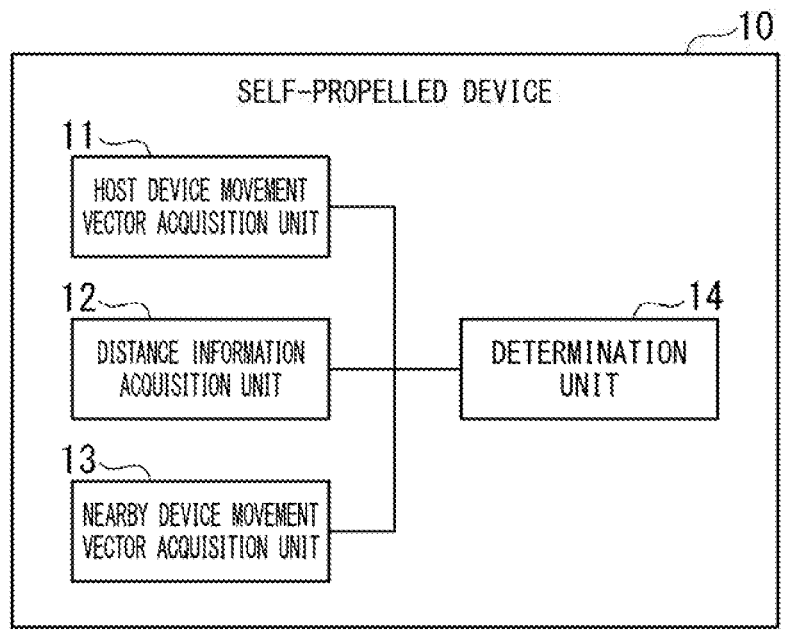
FIG. 1 is a block diagram illustrating a system configuration of a self-propelled device in a first example embodiment.

FIG. 1 is a block diagram illustrating a system configuration of the self-propelled device 10. The self-propelled device 10 includes at least a host device movement vector acquisition unit 11, a distance information acquisition unit 12, a nearby device movement vector acquisition unit 13, and a determination unit 14. The self-propelled device 10 indicates the whole autonomously movable device. Examples of the self-propelled device 10 include an automatic guided vehicle (AGV) or a drone.

The host device movement vector acquisition unit 11 acquires a host device movement vector including the movement speed of the self-propelled device 10.

The distance information acquisition unit 12 acquires nearby device distance information including the distance and direction to the self-propelled device 10 for each self-propelled device (hereinafter denoted as a "nearby device") located near the self-propelled device 10.

The nearby device movement vector acquisition unit 13 acquires a nearby device movement vector including the movement speed and movement direction of the nearby device for each nearby device which is a target for acquiring nearby device distance information in the distance information acquisition unit 12.

The determination unit 14 determines whether group movement is possible or not for each nearby device which is a target for acquiring a nearby device movement vector in the nearby device movement vector acquisition unit 13, on the basis of the nearby device distance information, the host device movement vector and the nearby device movement vector.

With such a configuration and operation, it is possible to determine whether group movement is possible or not on the basis of a distance between a host device and a nearby device, and movement vectors of the host device and the nearby device. The group movement referred to here indicates that a plurality of objects move in one group. An example is row traveling of a plurality of automobiles. In the group movement, efficient movement is assumed to be achieved by shortening a distance from a front device in a traveling direction.

In the determination of whether group movement is possible or not, devices out of neighboring nearby devices moving in directions and speeds similar to those of the host device are determined to be able to move in a group. Thus, they are regarded as performing group movement with devices showing behavior similar to that of the host device, and thus efficient movement is achieved while the possibility of collision is reduced. That is, it is possible to attain both safety and efficiency in the movement of the self-propelled device.

Second Example Embodiment

Hereinafter, the configuration and operation of a self-propelled device in a second example embodiment will be described with reference to FIGS. 2 to 9. Meanwhile, the same configurations and functions as those shown in the first example embodiment are denoted by the same reference numerals and signs, and thus the detailed description thereof will not be given. In the second example embodiment, by introducing the self-propelled device shown in the present invention, the possibility of a plurality of self-propelled devices moving efficiently from a certain place to another place will be described.

Figure 2:
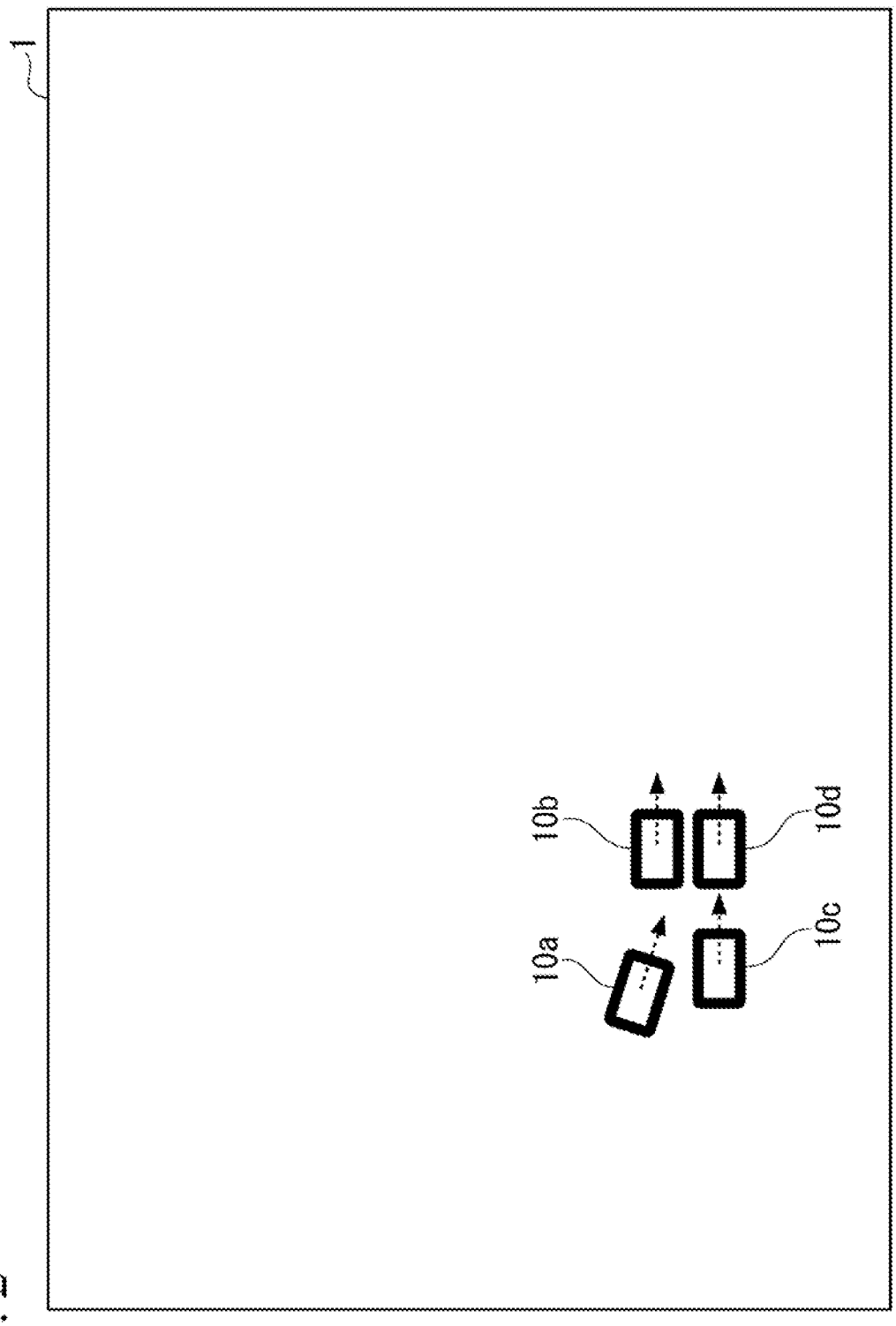
FIG. 2 is a diagram illustrating an outline of a second example embodiment.

FIG. 2 is a diagram illustrating an outline of the second example embodiment of the present invention. In the second example embodiment, a case in which a plurality of self-propelled devices located in a certain place within a warehouse 1 move in a group is assumed. In this case, a self-propelled device 10a differs from other self-propelled devices 10b, 10c, and 10d in its movement direction. In a case where their movements continue in this state, the movement directions interfere with each other, and thus smooth movement is inhibited. Specifically, collision occurs between the self-propelled devices, or it is necessary to slow down in order to avoid collision therebetween. Consequently, whether these self-propelled devices can move in a group is determined, and in a case where group movement is possible, it is shown that both safety and efficiency in the movement of the self-propelled devices can be attained by transitioning to such a state rapidly.

Figure 3:
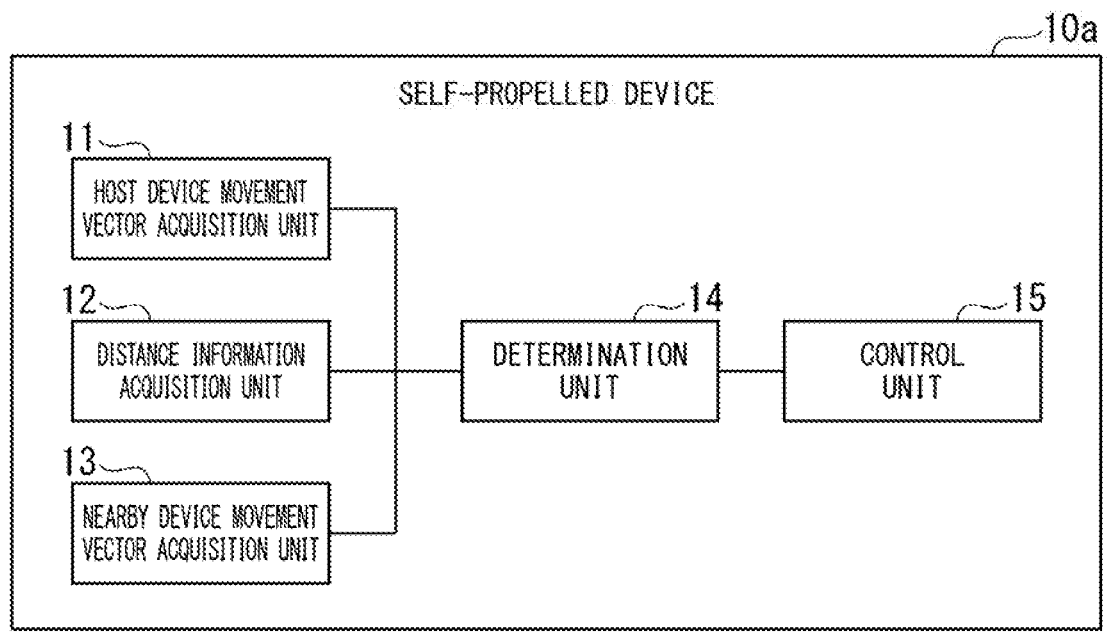
FIG. 3 is a block diagram illustrating a configuration of a self-propelled device in the second example embodiment.

FIG. 3 is a block diagram illustrating a configuration of the self-propelled device 10a in the second example embodiment of the present invention. The self-propelled device 10a includes at least the host device movement vector acquisition unit 11, the distance information acquisition unit 12, the nearby device movement vector acquisition unit 13, the determination unit 14, and a control unit 15. Among these components, the host device movement vector acquisition unit 11, the distance information acquisition unit 12, the nearby device movement vector acquisition unit 13, and the determination unit 14 have been described in the first example embodiment, and thus a description thereof will not be given.

When there is a nearby device group which is constituted by one or more nearby devices determined to be able to move in a group in the determination unit 14, the control unit 15 controls the movement speed and movement direction of the self-propelled device so as to approach the nearby device group and gradually approach the average of movement vectors of the nearby device group after the approach.

Figure 4:
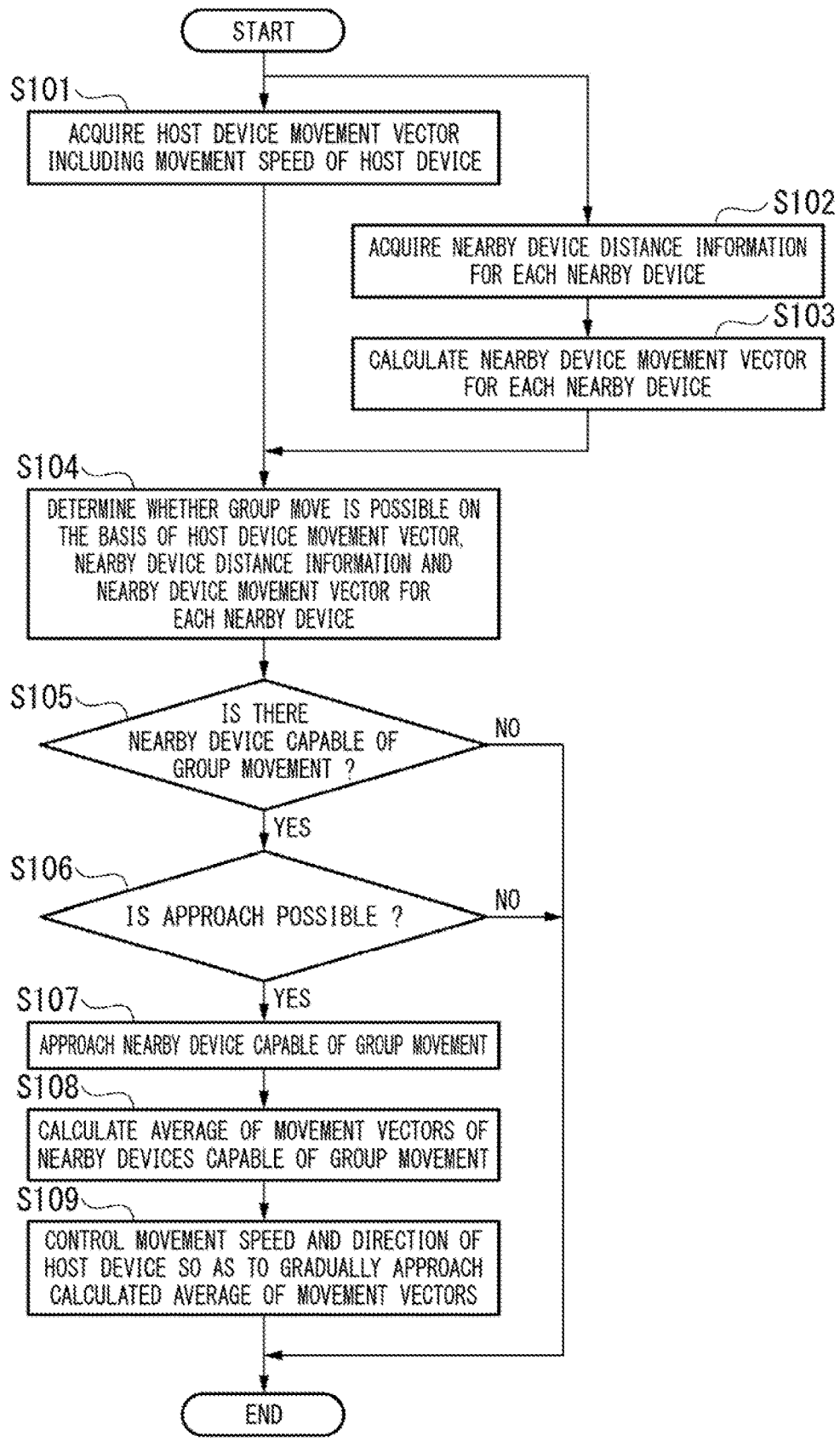
FIG. 4 is a flow chart showing operations of the self-propelled device in the second example embodiment.

Next, operations of the self-propelled device 10a in the second example embodiment will be described in detail with reference the accompanying drawings. FIG. 4 is a flow chart showing operations of the self-propelled device 10a in the second example embodiment.

The self-propelled device 10a in the second example embodiment first acquires a host device movement vector including the movement speed and movement direction of the host device on the basis of the operation of the host device movement vector acquisition unit 11 (step S101).

FIG. 5 is a diagram illustrating an example of a host device movement vector in the second example embodiment. In the example shown in the second example embodiment, movement speed information of the self-propelled device 10a is stored as the host device movement vector. In the present example embodiment, the movement direction of the self-propelled device 10a is assumed to be used as a reference. Therefore, the movement direction of the self-propelled device 10a is omitted.

In addition, nearby device distance information is acquired, through the operation of the distance information acquisition unit 12, for each nearby device located near the self-propelled device 10a (step S102).

Meanwhile, the self-propelled device 10a concurrently starts the operation of step S101 and the operation of step S102 as shown in FIG. 4.

Further, a nearby device movement vector is acquired, through the operation of the nearby device movement vector acquisition unit 13, for each nearby device (step S103). In the present example embodiment, the nearby device movement vector acquisition unit 13 calculates the nearby device movement vector for each nearby device.

FIG. 6 is a diagram illustrating an example of the nearby device distance information and the nearby device movement vector which are acquired by the self-propelled device 10a in the second example embodiment. A distance from the self-propelled device 10a and a direction when the movement direction of the self-propelled device 10a is used as a reference are acquired as the distance information, and a movement speed and a direction when the movement direction of the self-propelled device 10a is used as a reference is acquired as the nearby device movement vector for each of the self-propelled device 10b, the self-propelled device 10c, and the self-propelled device 10d which are nearby devices located near the self-propelled device 10a.

Next, whether the self-propelled device 10a and each nearby device can move in a group is determined, through the operation of the determination unit 14, for each nearby device on the basis of the host device movement vector, the nearby device distance information, and the nearby device movement vector (step S104). A specific example is a method of determining group movement to be possible for a nearby device in which a distance from the self-propelled device included in the nearby device distance information falls below a predetermined value, a speed difference (a speed ratio or the like) calculated from the host device movement vector and the nearby device movement vector falls below a predetermined value, and a difference in movement direction calculated from the host device movement vector and the nearby device movement vector falls below a predetermined value. In this example, it is possible to avoid a sudden change in movement (such as sudden acceleration or a sudden turn) in the control unit 15 by extracting nearby devices of which the movement speeds and movement directions are similar to each other.

FIG. 7 is a diagram illustrating an example of operation results of the determination unit 14 of the self-propelled device 10a in the second example embodiment. In the present example embodiment, for example, "a distance is within 1.5 m," "a difference in speed is within 1 m/s," and "a difference in movement direction is within 30°" are assumed to be references for determining group movement to be possible. Then, the self-propelled device 10c satisfies all the references. Thus, the self-propelled device 10c is determined to be capable of group traveling.

Subsequently, whether there is a nearby device capable of group movement is confirmed from the determination result through the operation of the control unit 15 (step S105). When there is none, the operation is terminated. Meanwhile, in the present example embodiment, the self-propelled device 10c satisfies the requirements.

When there is a nearby device group capable of group movement, the control unit 15 first confirms whether approach is possible (step S106). Specifically, a determination is made by comparing the movement speed and movement direction of the nearby device group with the movement speed and movement direction of the host device. When approach is not possible ("NO" in step S106), group movement is not possible, and thus the operation is terminated. In the present example embodiment, the control unit 15 compares the movement speed of the self-propelled device 10a with the movement speed of the nearby device group, and determines that approach is possible in a case where the movement speed of the self-propelled device 10a is higher than the movement speed of the nearby device group. In the present example embodiment, since the movement speed of the self-propelled device 10a is higher than the movement speed of the self-propelled device 10c, it is possible to determine that approach is possible.

When approach is possible ("YES" in step S106), the self-propelled device 10a approaches the nearby device group (step S107). Specifically, for example, the control unit 15 performs the acceleration and deceleration or turn of the self-propelled device 10a which is the host device.

After the approach, the control unit 15 calculates an average of the nearby device movement vectors with respect to the nearby device group capable of group movement (step S108).

The control unit 15 controls the movement speed and direction of the host device so as to gradually approach the calculated average of the movement vectors (step S109). In the present example embodiment, specifically, for example, the control unit 15 decelerates gradually so as to gradually approach the movement vector of the self-propelled device 10c (1.25 m/s=>1.00 m/s), and turns counterclockwise. After the control, the operation is completed.

Figure 8:
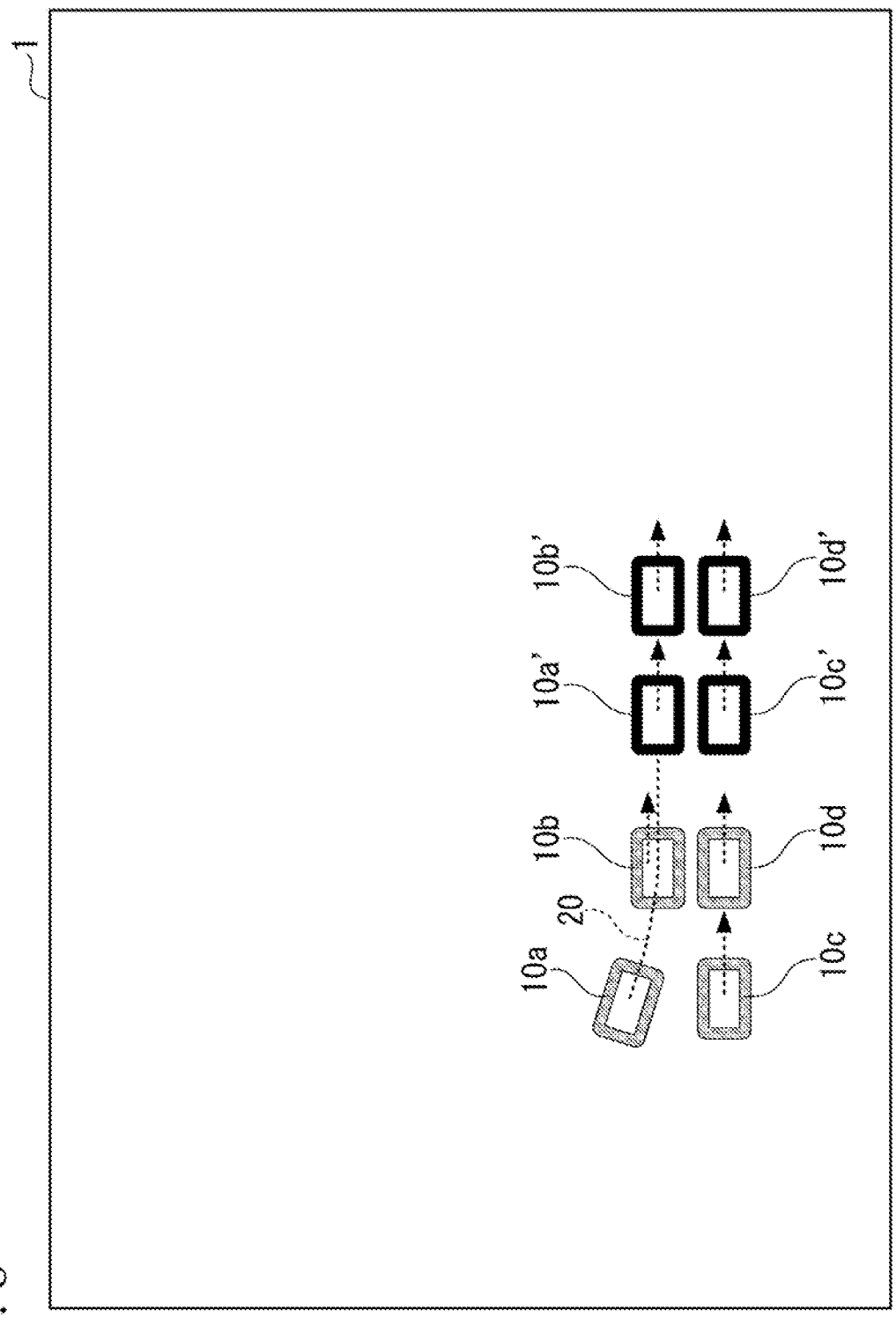
FIG. 8 is a diagram illustrating an aspect of movement of the self-propelled device based on an operation of a control unit in the second example embodiment.

FIG. 8 is a diagram illustrating an aspect of movement of the self-propelled device 10 based on the operation of the control unit 15 in the second example embodiment. The self-propelled device 10a moves through a route 20 with movement of the self-propelled device 10a being controlled so as to gradually approach the movement vectors of the self-propelled devices 10b, 10c, and 10d. Thereby, the positions of the self-propelled devices 10a, 10b, 10c, and 10d after a predetermined period of time are set to 10a', 10b', 10c', and 10d', respectively. In this manner, the self-propelled device 10a can merge with the self-propelled devices 10b, 10c, and 10d.

With such a configuration and operation, the self-propelled device 10a can smoothly merge the host device into the nearby device group in accordance with the result of determination of whether group movement is possible or not. Thus, the self-propelled device 10a can achieve its efficient movement while the possibility of collision is reduced. That is, the self-propelled device 10a can attain both safety and efficiency in the movement of the self-propelled device.

Meanwhile, the control unit 15 may further control the movement speed and movement direction of the self-propelled device such that a distance from a nearby device exceeds a safety value which is a predetermined value. Specifically, in a case where a distance from a nearby device falls below or is estimated to fall below a safety value while controlling the movement speed and movement direction of the host device so as to gradually approach the average of the nearby device movement vectors, the speed and movement direction are controlled so as to prioritize the distance from a nearby device exceeding the safety value.

Figure 9:
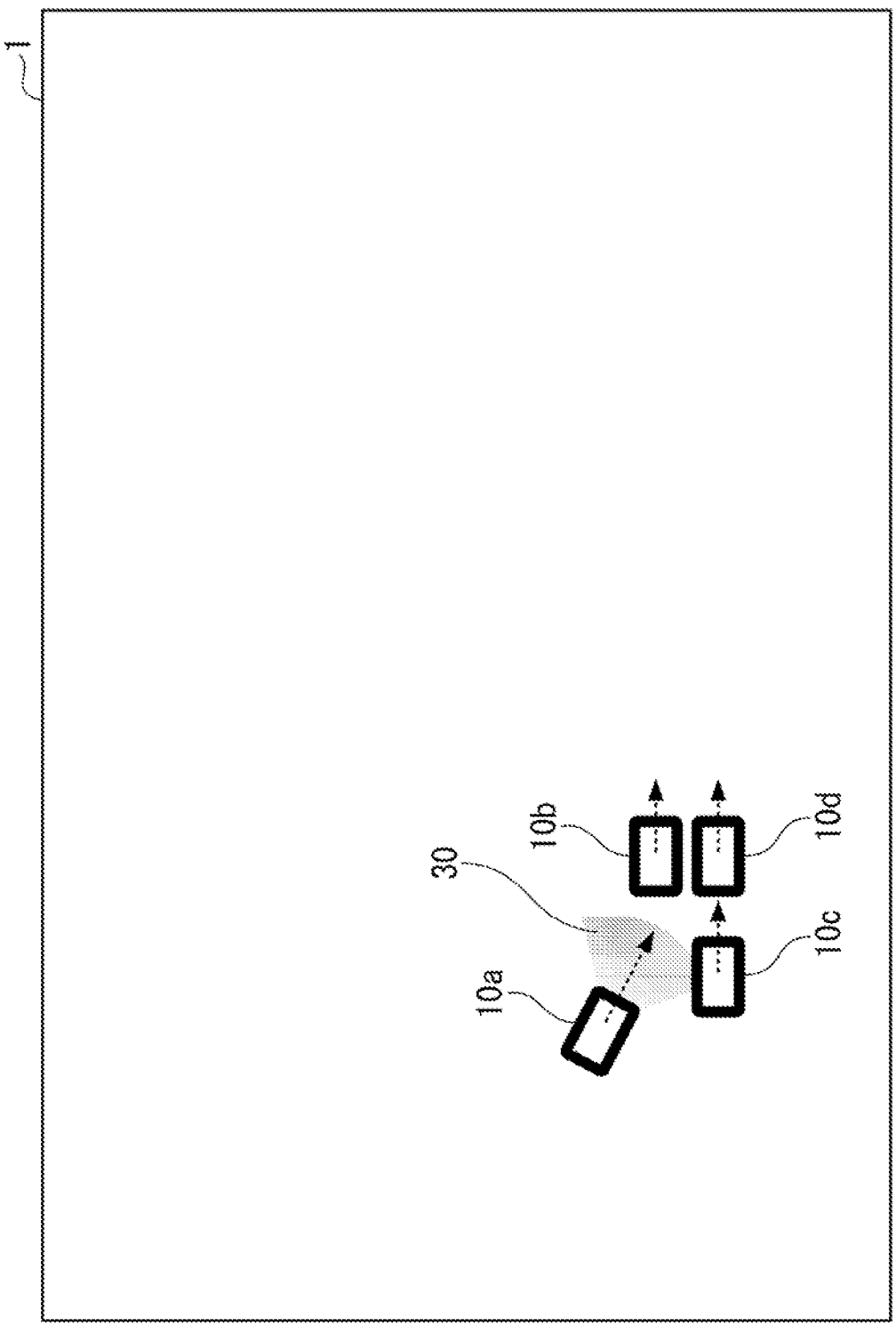
FIG. 9 is a diagram illustrating an aspect of the self-propelled device in the second example embodiment.

FIG. 9 is a diagram illustrating an aspect of the self-propelled device 10 in the second example embodiment. In FIG. 9, the nearby self-propelled device 10c is located within a predetermined range 30 when seen from the self-propelled device 10a. The predetermined range 30 is determined according to the safety value, and in a case where there is a nearby device within the predetermined range 30, the possibility of contact with the device is assumed to increase. According to FIG. 8, a distance from the self-propelled device 10c falls below the safety value when seen from the self-propelled device 10a. In this case, the control unit 15 of the self-propelled device 10a controls the movement speed and movement direction of the self-propelled device 10a such that the distance from the self-propelled device 10c exceeds the safety value, that is, the self-propelled device 10c goes outside the predetermined range 30, in preference to gradually approaching the average of the movement vectors of the nearby self-propelled devices 10b, 10c, and 10d. Specifically, for example, control such as stronger deceleration or a more sudden turn is performed.

With such a configuration and operation, it is possible to avoid contact with a nearby device. That is, it is possible to further increase safety in the movement of the self-propelled device.

In addition, the control unit 15 may further cause the safety value to be determined according to the movement speed of the self-propelled device 10. Specifically, the safety value may be set to a larger value in a case where the movement speed of the self-propelled device 10a is high, and may be set to a smaller value in a case where it is slow. With such a configuration and operation, it is possible to perform more appropriate contact avoidance behavior in accordance with the movement speed of the self-propelled device 10. That is, it is possible to attain both safety and efficiency in the movement of the self-propelled device.

In a case where a change in speed does not occur for a certain period of time, the control unit 15 may further perform control to increase the movement speed of the self-propelled device 10. The efficient movement of the self-propelled device 10 is achieved by increasing the movement speed of the self-propelled device 10.

In the present example embodiment, the host device movement vector acquisition unit 11 acquires a host device movement vector including the movement speed of the self-propelled device 10. As a modification example, the host device movement vector acquisition unit 11 may acquire a host device movement vector using information relating to prediction of movement from a current location after a predetermined period of time as the host device movement vector.

Third Example Embodiment

Hereinafter, the configuration and operation of a self-propelled device in a third example embodiment of the present invention will be described with reference to FIGS. 10 to 18. Meanwhile, the same configurations and functions as those shown in the first and second example embodiments are denoted by the same reference numerals and signs, and thus the detailed description thereof will not be given. In the third example embodiment, enabling the self-propelled device to move efficiently to a movement destination by determining whether group movement is possible or not for a nearby device group on the basis of the distance and direction to a movement destination of the self-propelled device and the movement speed and movement direction of the nearby device group will be described.

Figure 10:
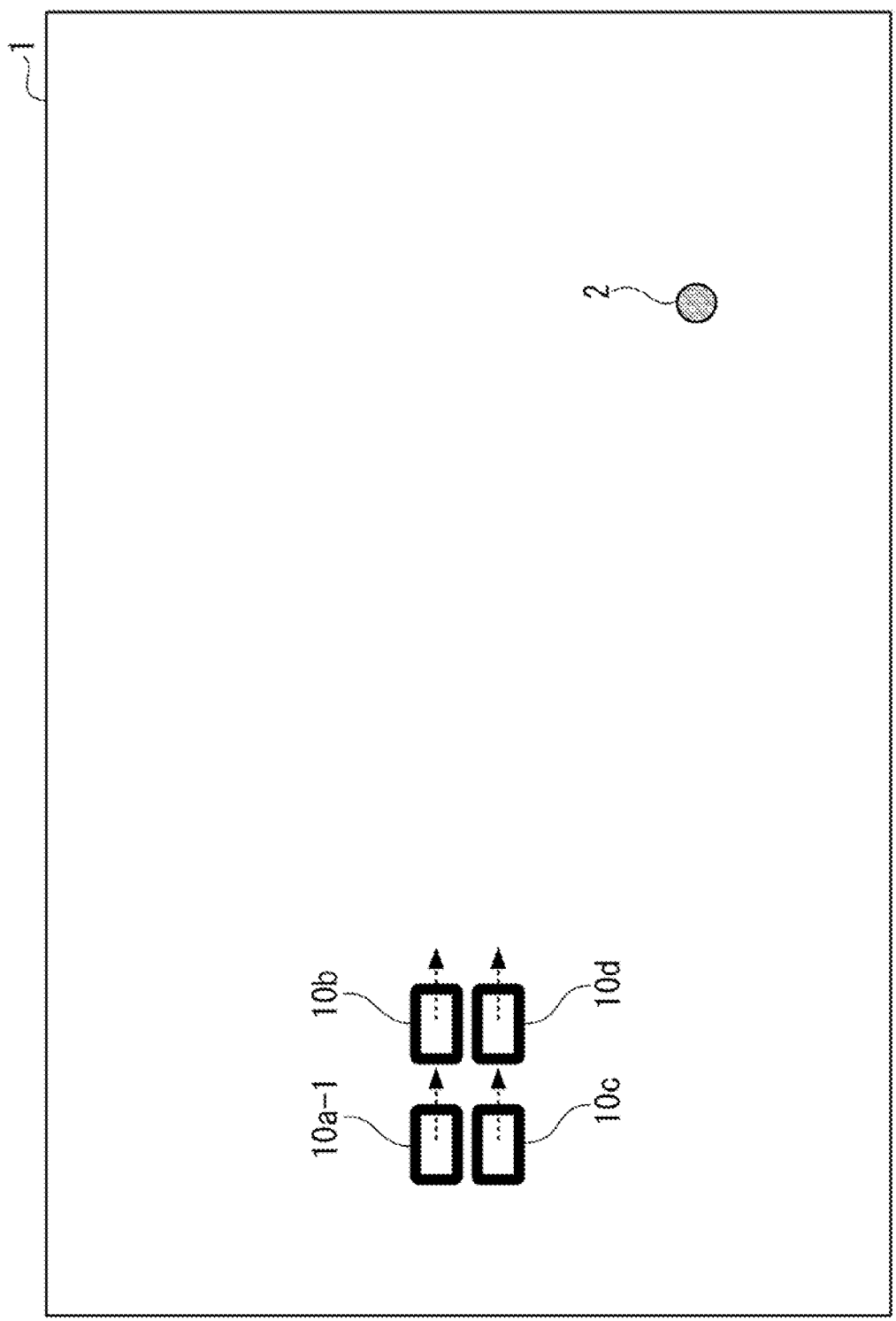
FIG. 10 is a diagram illustrating an outline of a third example embodiment.

FIG. 10 is a diagram illustrating an outline of the third example embodiment of the present invention. In the third example embodiment, a state in which the self-propelled devices 10a-1, 10b, 10c, and 10d perform group movement and the self-propelled device 10a-1 has its movement destination 2 set therein is assumed.

Figure 11:
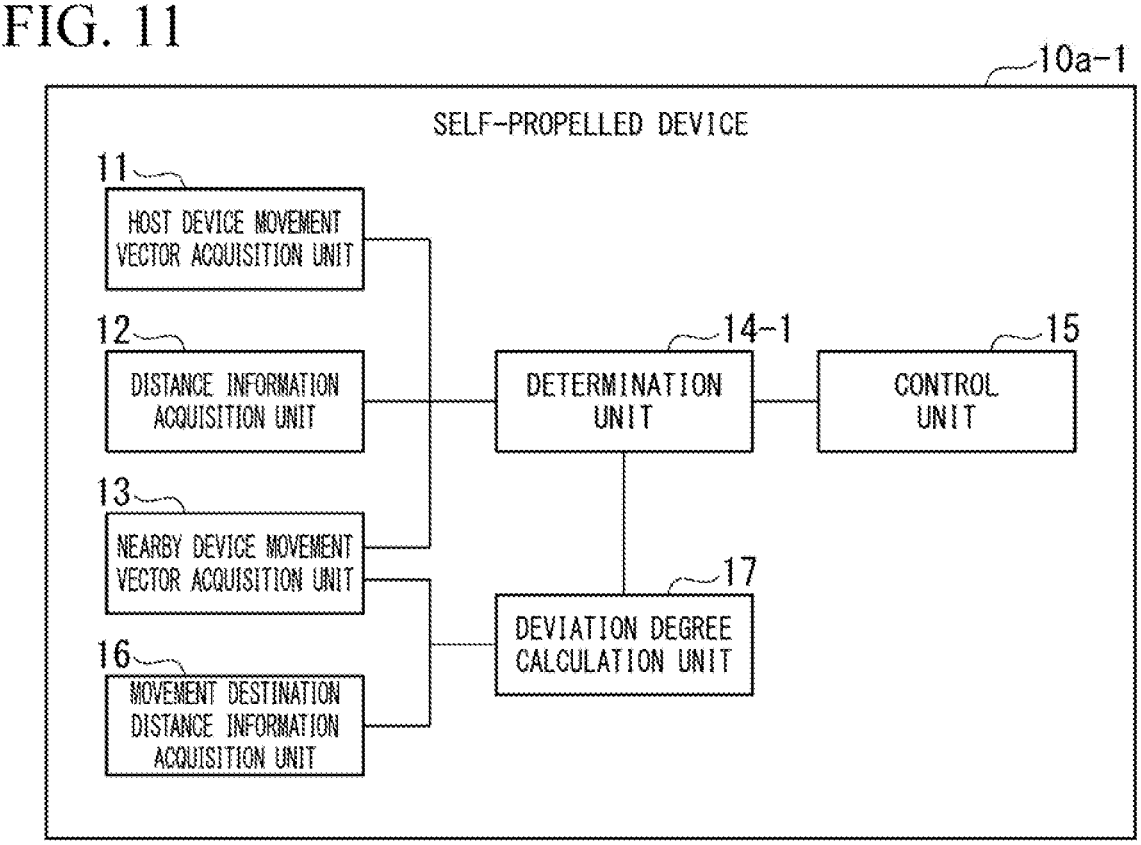
FIG. 11 is a block diagram illustrating a configuration of a self-propelled device in the third example embodiment.

FIG. 11 is a block diagram illustrating a configuration of the self-propelled device 10a-1 in the third example embodiment of the present invention. The self-propelled device 10a-1 includes at least the host device movement vector acquisition unit 11, the distance information acquisition unit 12, the nearby device movement vector acquisition unit 13, a determination unit 14-1, the control unit 15, a movement destination distance information acquisition unit 16, and a deviation degree calculation unit 17. Among these components, the host device movement vector acquisition unit 11, the distance information acquisition unit 12, the nearby device movement vector acquisition unit 13, and the control unit 15 have been described in the first and second example embodiments, and thus a description thereof will not be given.

The determination unit 14-1 determines that group movement is not possible in a case where the degree of deviation calculated by the deviation degree calculation unit 17 exceeds a predetermined value relating to group movement determination, in addition to the operation described in the second example embodiment.

The movement destination distance information acquisition unit 16 acquires movement destination distance information including the distance and direction to the movement destination 2 from the self-propelled device 10a-1. Specifically, for example, a straight-line distance from the self-propelled device 10a-1 to the movement destination 2 is acquired as a distance, and an angle when the self-propelled device 10a-1 is directed toward the movement destination 2 in its traveling direction is acquired as a direction.

The deviation degree calculation unit 17 calculates the degree of deviation on the basis of the nearby device movement vector acquired from the nearby device movement vector acquisition unit 13 and the movement destination distance information acquired from the movement destination distance information acquisition unit 16. Specifically, for example, a difference in angle between the movement direction of the nearby self-propelled device 10 and the direction of the movement destination 2 is calculated as the degree of deviation.

Figure 12:
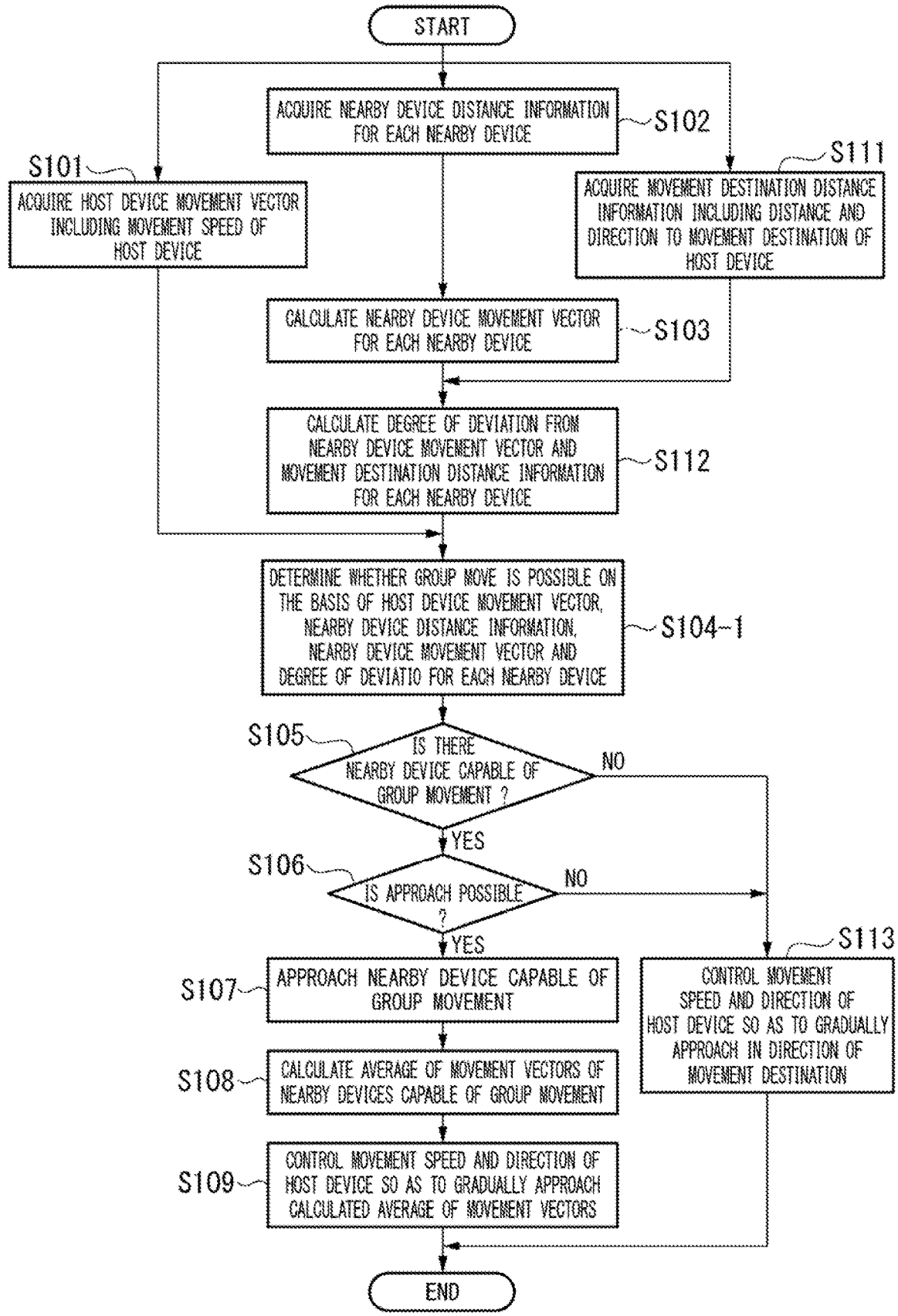
FIG. 12 is a flow chart showing operations of the self-propelled device in the third example embodiment.

Next, operations of the self-propelled device 10a-1 in the third example embodiment will be described in detail with reference to the accompanying drawings. FIG. 12 is a flow chart showing operations of the self-propelled device 10a-1 in the third example embodiment. Meanwhile, steps S101 to S109 (except step S104) are the same as those of the operations of the self-propelled device 10a in the second example embodiment, and thus a description thereof will not be given.

The self-propelled device 10a-1 first acquires the host device movement vector (step S101), acquires the nearby device distance information (step S102), calculates the nearby device movement vector (step S103), and acquires the movement destination distance information including the distance and direction to the movement destination of the host device through the operation of the movement destination distance information acquisition unit 16 (step S111). Through the operation of the deviation degree calculation unit 17, the degree of deviation is calculated on the basis of the nearby device movement vector and the movement destination distance information (step S112). In the present example embodiment, as an example of a method of calculating the degree of deviation, a difference in angle between the traveling direction of the nearby self-propelled device 10 and the direction of the movement destination 2 of the self-propelled device 10a-1 is assumed to be used.

Meanwhile, the self-propelled device 10a-1 concurrently starts the operation of step S101, the operation of step S102, and the operation of step S111 as shown in FIG. 12.

Figures 13, 14, 15:
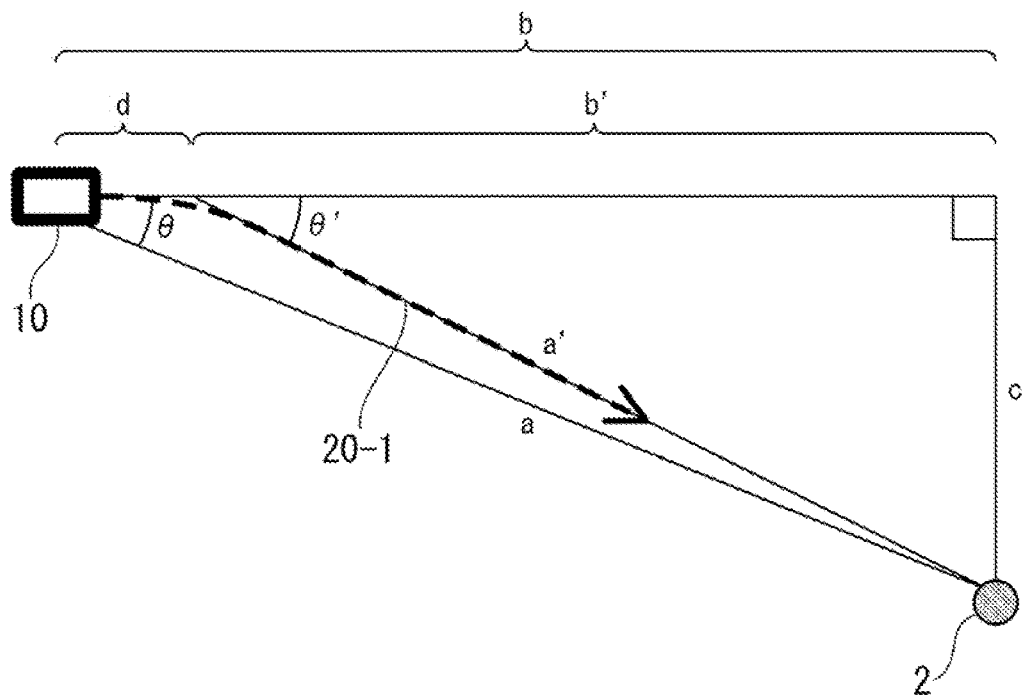
FIG. 13 is a diagram illustrating an example of movement destination distance information in the third example embodiment.
FIG. 14 is a diagram illustrating an example of a method of correcting a degree of deviation in the third example embodiment.
FIG. 15 is a diagram illustrating an example of the degree of deviation and determination results in the third example embodiment.

FIG. 13 is a diagram illustrating an example of movement destination distance information in the third example embodiment of the present invention. According to FIG. 13, it can be understood that the movement speed of the self-propelled device 10a-1 is 1 m/s, the distance to the movement destination 2 is 60 m, and the difference in angle up to the movement destination 2 is −10°, that is, an angle of 10° clockwise.

Meanwhile, in calculating the degree of deviation, the difference in angle may be corrected and calculated on the basis of the movement destination distance information, the host device movement vector and the movement characteristics of the self-propelled device. This is because, in an actual self-propelled device, it takes a certain period of time until an instruction of a direction change is sent out and then the direction change is completed. An example of a specific method of calculating correction will be described in detail with reference to FIG. 14. FIG. 14 is a diagram illustrating an example of a method of correcting a degree of deviation in the third example embodiment of the present invention.

According to the example of FIG. 14, a as a distance from the self-propelled device 10 to the movement destination 2 and an angle θ as a direction are acquired as the movement destination distance information. On the other hand, in a case where the self-propelled device 10 changes its direction and moves to the movement destination 2, a route 20-1 is assumed to be drawn. Since the self-propelled device 10 turns in the direction of the movement destination 2 while continuing to move, it can be regarded as having moved only by a distance d in an original traveling direction. Here, the distance d is determined according to the movement speed and movement characteristics of the self-propelled device 10, and thus can be calculated from the host device movement vector and the movement characteristics of the self-propelled device.

Next, an angle θ' up to the movement destination 2 after correction, that is, after movement in a traveling direction only by the distance d can be calculated as follows using a, d, and θ. First, the distance a to the movement destination 2 before correction can be resolved into a distance b equivalent to an component of the self-propelled device 10 in its traveling direction and a distance c equivalent to an component perpendicular to the traveling direction, and the following Expressions (1) and (2) are obtained.

$$b = a * \cos(\theta) \quad (1)$$

$$c = a * \sin(\theta) \quad (2)$$

(Here, "*" indicates a multiplication)

Here, in the case of movement in the traveling direction only by the distance d, the angle θ' after correction becomes the following Expression (3).

$$\theta' = \arctan(c/b) = \arctan(c/(b-d)) \quad (3)$$

(Here, "/" indicates a division)

From the above, θ' can be calculated using a, d, and θ.

Through the operation of the determination unit 14, whether group movement is possible or not is determined for each nearby device on the basis of the host device movement vector, the nearby device distance information, the nearby device movement vector and the degree of deviation (step S104-1). As a determination method relating to the degree of deviation, for example, it is confirmed whether the calculated degree of deviation is smaller than a predetermined value. In the case of being smaller, it can be determined that the influence on arrival at the movement destination 2 is small even when group movement is continued, and thus it is determined that the group movement is possible. On the contrary, in case of being larger, it is determined that the group movement is not possible. In a case where the group movement is not performed ("NO" in steps S105 and S106), the control unit 15 controls the movement speed and movement direction of the self-propelled device 10 which is a host device so as to gradually approach the movement destination (step S113). In the present example embodiment, the control unit 15 controls the movement speed and movement direction of the self-propelled device 10 which is a host device so as to gradually approach in the direction of the movement destination. After the control, the operation is terminated.

Meanwhile, the predetermined value which is used in the determination of group movement may be determined as, for example, a difference in angle when an increment of movement distance calculated from the difference in angle and a deemed decrement of movement distance considering an increment of movement efficiency during group movement are compared with each other, and both are balanced. Here, the increment of movement distance is represented by, for example, a difference between the sum of b (or b') and c in FIG. 14 and a (or a'). In addition, the deemed decrement of movement distance considering an increment of movement efficiency during group movement is set to, for example, a decrement of movement distance in a case where benefit when movement efficiency as the whole space or movement efficiency such as the fuel efficiency of a moving device constituting a group is improved by group movement is given as a coefficient for the movement distance in group movement. Specifically, for example, in a case where the benefit brought about by group movement is assumed to be 1.25 times single movement, the coefficient can be given as 0.8 (=1÷1.25). In this case, the movement distance during group movement is determined regarded as being equivalent to 0.8 times the movement distance during single movement. Specifically, for example, it is equal to 0.8 times b (or b') in FIG. 14.

Here, the predetermined value which is used in the determination of group movement when the coefficient is set to 0.8 is given as an angle $\theta$ satisfying the following Expression (5) from the following Expression (4).

$$a = 0.8b + c = a(0.8*\cos(\theta) + \sin(\theta)) \quad (4)$$

$$0.8*\cos(\theta) + \sin(\theta) = 1 \quad (5)$$

FIG. 15 is a diagram illustrating an example of the degree of deviation and determination results in the third example embodiment of the present invention. Meanwhile, in the present example embodiment, it is assumed to take three seconds until a change of the direction of the self-propelled device 10a-1. In addition, the benefit during group movement is assumed to be 1.25 times. Since the self-propelled device 10a-1 performs group movement with the self-propelled devices 10b, 10c, and 10d which are nearby devices, its movement direction becomes the same as that of each nearby device. Then, for all the nearby devices, the degree of deviation after correction becomes 10.5° from Expressions (1) to (3). In addition, the predetermined value which is used in the determination of group movement, that is, a threshold becomes 12.7° from Expression (5). Thus, in the example shown in FIG. 10, it is determined that group movement is possible on the basis of the degree of deviation from the movement destination 2.

Figure 16:
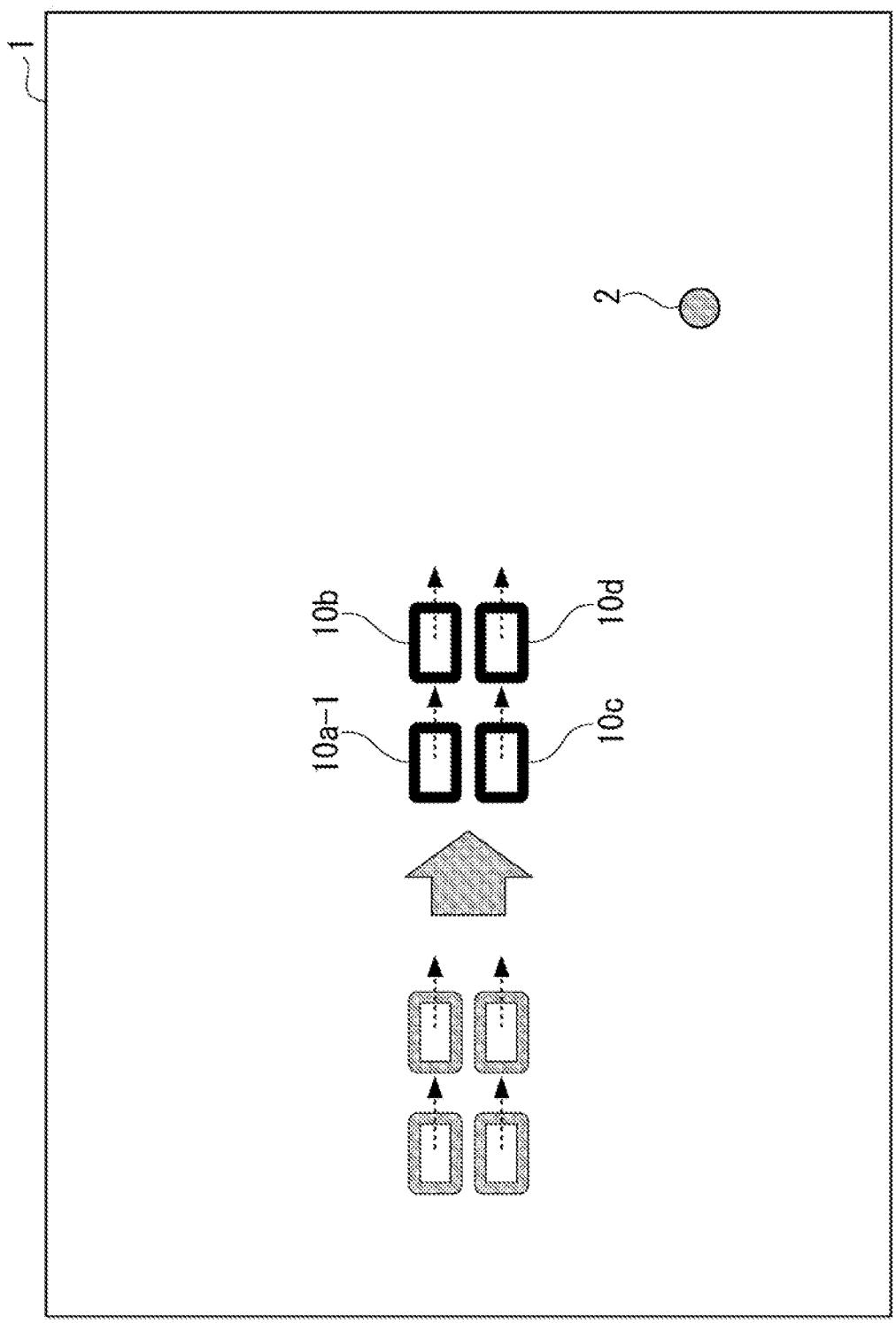
FIG. 16 is a diagram illustrating an outline of another case example of the third example embodiment.

Next, a case in which each of the self-propelled devices 10a-1, 10b, 10c, and 10d further moves is assumed. FIG. 16 is a diagram illustrating an outline in another case example of the third example embodiment of the present invention. From the state shown in FIG. 10, a situation in which a self-propelled device group continues to perform group movement is assumed.

FIG. 17 is a diagram illustrating an example of movement destination distance information of the self-propelled device 10a-1 in the situation shown in FIG. 16. Here, a case in which a distance from the self-propelled device 10a-1 to the movement destination 2 has been changed to 30 m, and its direction has been changed to −20° when seen in the movement direction of the self-propelled device is assumed.

In addition, FIG. 18 is a diagram illustrating an example of the degree of deviation and determination results of the self-propelled device 10a-1 in the situation shown in FIG. 16. Then, the degree of deviation after correction becomes 22.1°. Since this is larger than a threshold of 12.7°, it is determined that group movement is not possible for all the nearby devices.

With such a configuration and operation, even in a case where the direction of group movement and the location direction of a movement destination are different from each other, the self-propelled device 10a-1 can appropriately determine whether group movement is possible or not in accordance with the degree of deviation. That is, the self-propelled device 10a-1 can further increase efficiency in the movement of the self-propelled device.

In addition, as shown in the description in the above example embodiment, the self-propelled device 10a-1 can appropriately determine whether group movement is possible or not including the influence of the actual movement characteristics of the self-propelled device by correcting and calculating a difference in angle on the basis of the movement destination distance information, the host device movement vector and the movement characteristics of the self-propelled device in the calculation of the degree of deviation. That is, the self-propelled device 10a-1 can further increase efficiency in the movement of the self-propelled device.

Further, as shown in the description in the above example embodiment, the self-propelled device 10a-1 gives, as a predetermined value used in the determination of group movement, a difference in angle when an increment of movement distance calculated from a difference in angle and a deemed decrement of movement distance considering an increment of movement efficiency during group movement are compared with each other, and both are balanced. Therefore, the self-propelled device 10a-1 can appropriately determine whether group movement is possible or not in consideration of a loss of the total movement distance based on group movement and benefit to the whole system based on group movement. That is, the self-propelled device 10a-1 can further increase efficiency in the movement of the self-propelled device.

Fourth Example Embodiment

Hereinafter, the configuration and operation of a self-propelled device in a fourth example embodiment of the present invention will be described with reference to the accompanying drawings. Meanwhile, the same configurations and functions as those shown in the first to third example embodiments are denoted by the same reference numerals and signs, and thus the detailed description thereof will not be given. In the fourth example embodiment, a description will be given of a point that, in a case where there is a deviation in the movement destination of the self-propelled device and the movement speed and direction thereof in the third example embodiment, group movement can be continued by resetting the movement destination, and the self-propelled device can be moved efficiently.

Figure 19:
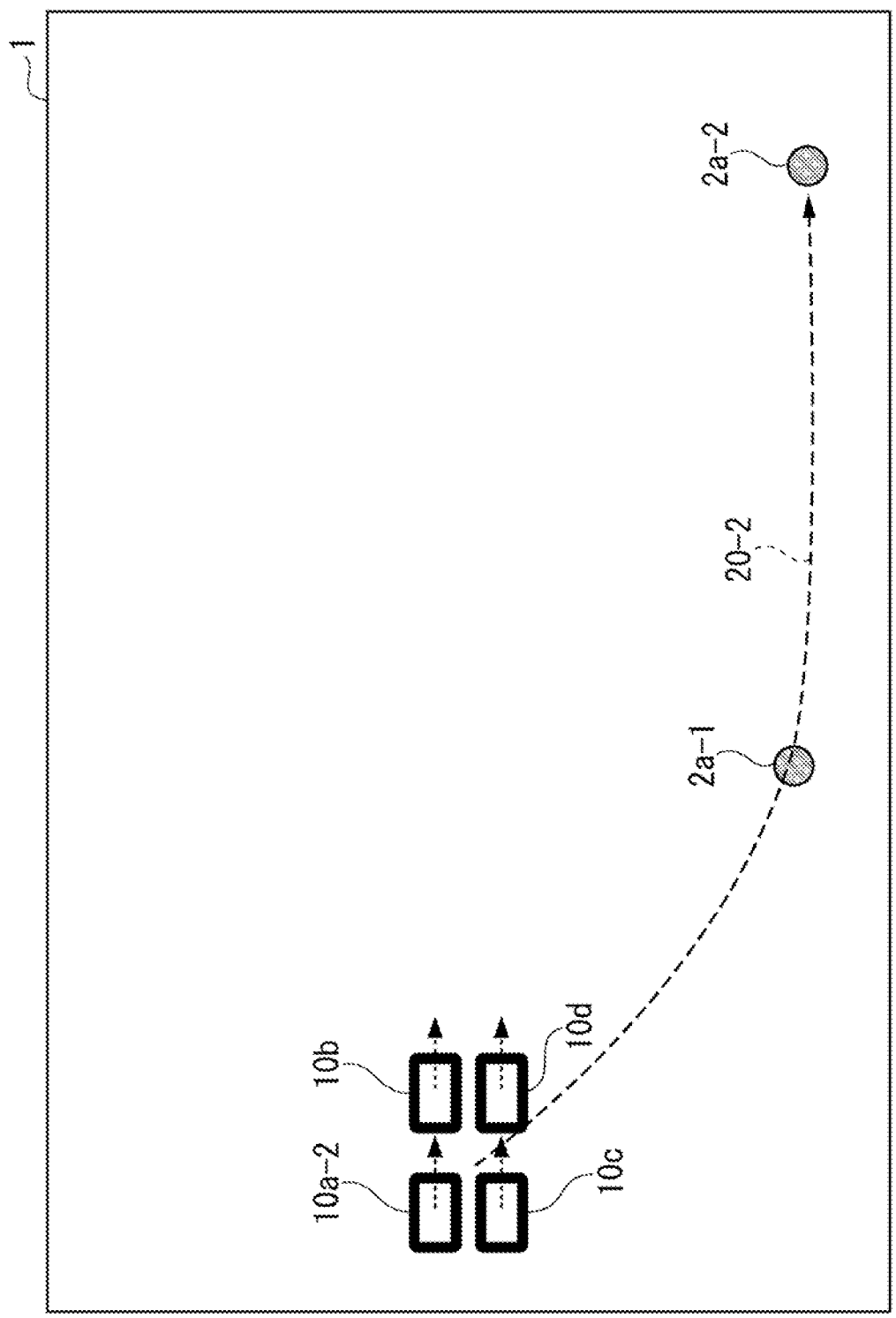
FIG. 19 is a diagram illustrating an outline of a fourth example embodiment.

FIG. 19 is a diagram illustrating an outline of the fourth example embodiment of the present invention. In the fourth example embodiment, a state in which self-propelled devices 10a-2, 10b, 10c, and 10d perform group movement, and 2a-1 is set as an immediate movement destination and 2a-2 is set as the next movement destination in the self-propelled device 10a-2 is assumed. In this case, the self-propelled device 10a-2 preferably moves along the route 20-2 in order to pass through the movement destinations 2a-1 and 2a-2, and it is assumed that, for the immediate movement destination 2a-1 of the self-propelled device 10a-2, the degree of deviation from its movement direction is larger than a predetermined value.

Figure 20:
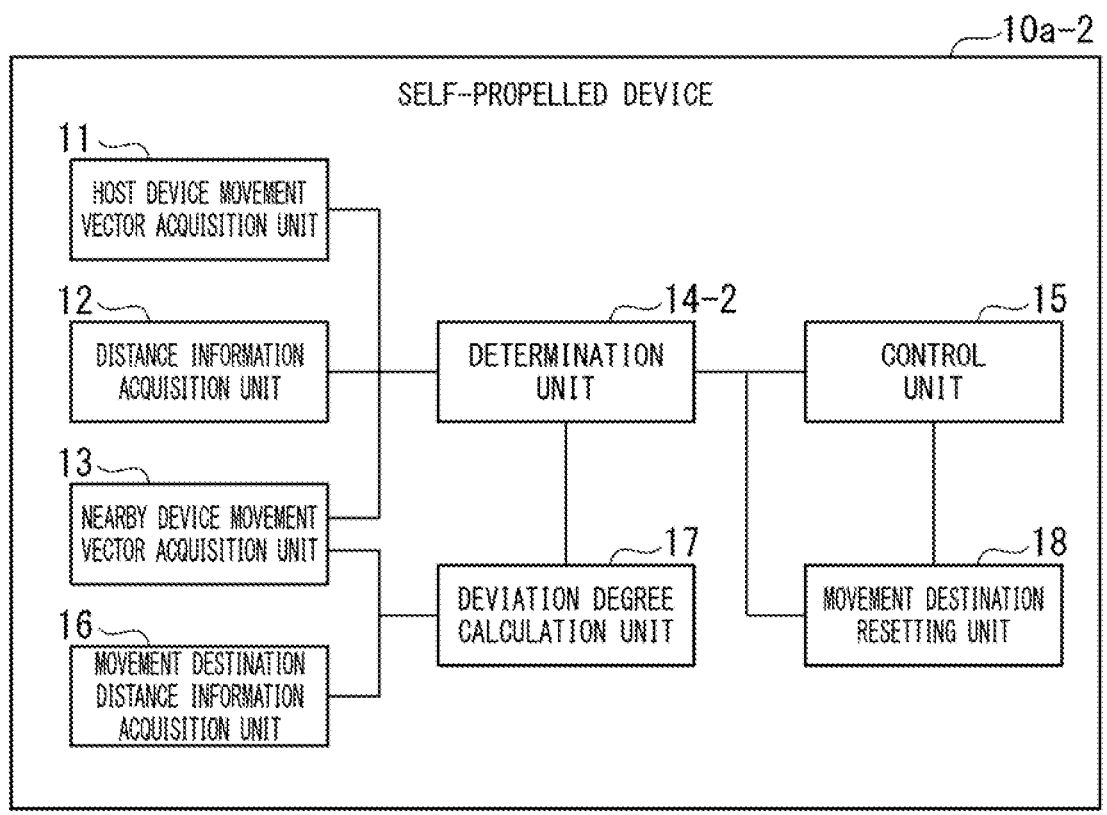
FIG. 20 is a block diagram illustrating a configuration of a self-propelled device in the fourth example embodiment.

FIG. 20 is a block diagram illustrating a configuration of the self-propelled device 10a-2 in the fourth example embodiment of the present invention. The self-propelled device 10a-2 includes at least the host device movement vector acquisition unit 11, the distance information acquisition unit 12, the nearby device movement vector acquisition unit 13, a determination unit 14-2, the control unit 15, the movement destination distance information acquisition unit 16, the deviation degree calculation unit 17, and a movement destination resetting unit 18. Among these components, the host device movement vector acquisition unit 11, the distance information acquisition unit 12, the nearby device movement vector acquisition unit 13, the control unit 15, the movement destination distance information acquisition unit 16, and the deviation degree calculation unit 17 have been described in any of the first to third example embodiments, and thus a description thereof will not be given.

When it is determined that group movement is not possible, the determination unit 14-2 determines whether the reason is because the degree of deviation calculated by the deviation degree calculation unit exceeds a predetermined value relating to the determination of group movement, in addition to the operation described in the third example embodiment.

The movement destination resetting unit 18 is called by the determination unit 14-2 in a case where the reason for the determination of group movement not being possible lies in the degree of deviation, and determines whether the movement destination can be reset in the movement direction of the self-propelled device 10a-2 which is a host device. Specifically, for example, in a case where a plurality of movement destinations are set to pass through the movement destinations in order, and the host device can pass through the second and subsequent movement destinations even when the host device continues to move in its movement direction, it is determined that the movement destinations can be reset. In a case where it is determined that the movement destinations can be reset, the movement destinations are reset.

Figure 21:
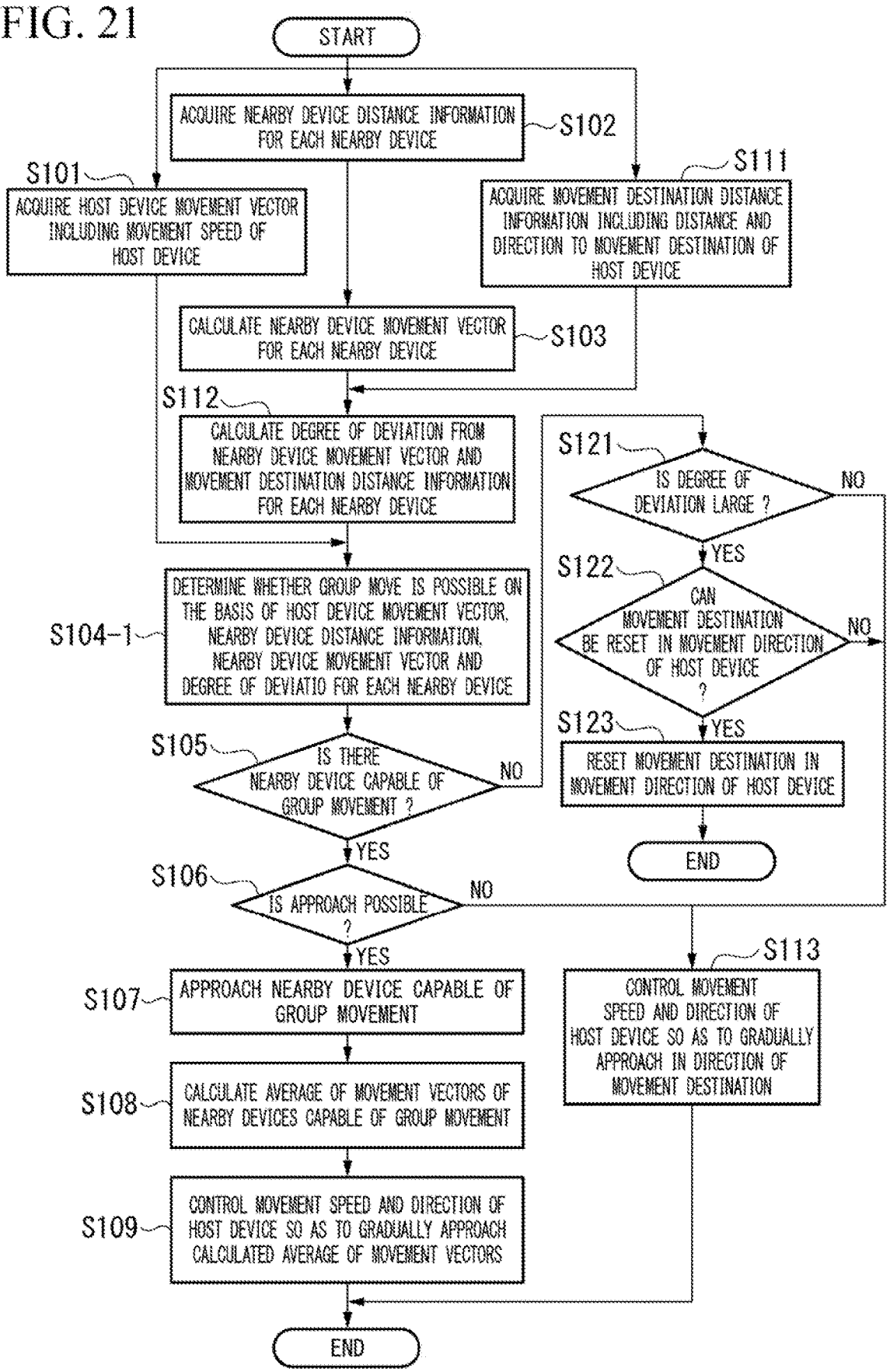
FIG. 21 is a flow chart showing operations of the self-propelled device in the fourth example embodiment.

Next, operations of the self-propelled device 10a-2 in the fourth example embodiment will be described in detail with reference to the accompanying drawings. FIG. 21 is a flow chart showing operations of the self-propelled device 10a-2 in the fourth example embodiment.

Meanwhile, operations of steps S101 to S109 and steps S111 to S113 are the same as the operations of the self-propelled devices 10a and 10a-1 in the second and third example embodiments, and thus a description thereof will not be given.

In addition, the self-propelled device 10a-2 concurrently starts the operation of step S101, the operation of step S102, and the operation of step S111 as shown in FIG. 21.

In a case where it is determined that there is not a nearby device capable of group movement through the operation of step S105 ("No" in step S105), the self-propelled device 10a-2 determines whether the reason for the determination of group movement not being possible is because the degree of deviation is large. That is, the self-propelled device 10a-2 determines whether the reason is because the degree of deviation calculated by the deviation degree calculation unit 17 exceeds a predetermined value relating to the determination of group movement (step S121). Otherwise ("No" in step S121), the process proceeds to step S113.

In a case where it is determined that the reason is because the degree of deviation is large ("Yes" in step S121), it is determined whether the movement destination can be reset in the movement direction of the host device through the operation of the movement destination resetting unit 18 (step S122). In a case where resetting is possible ("Yes" in step S122), the movement destination resetting unit 18 resets the movement destination in the movement direction of the host device (step S123). Specifically, for example, the movement destination resetting unit 18 resets the movement destination to the movement direction of the host device and positions at which the host device can pass through the second and subsequent movement destinations. After the setting, the operation is terminated. In a case where resetting is not possible ("No" in step S122), the process proceeds to step S113.

Figure 22:
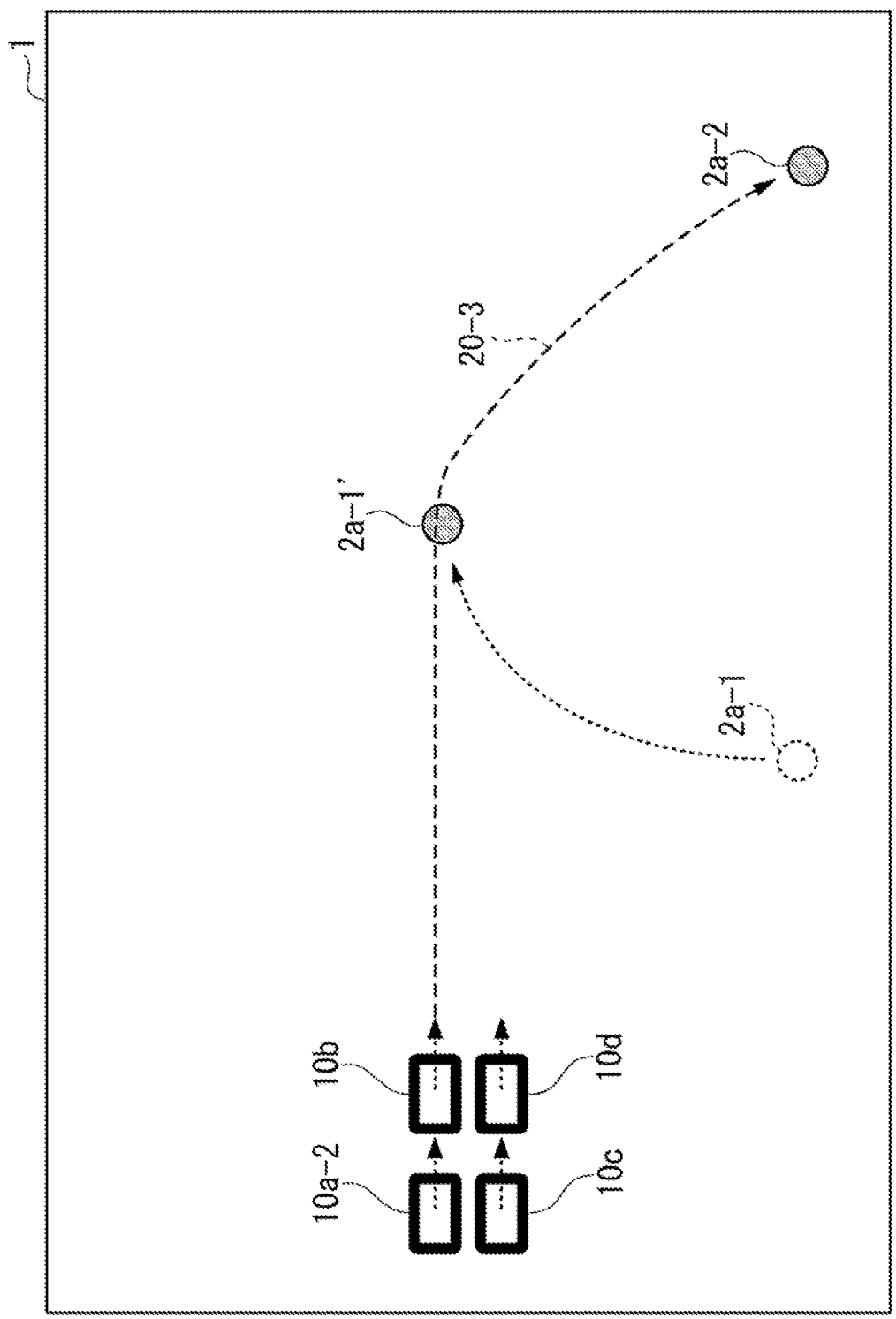
FIG. 22 is a diagram illustrating an example of movement destination resetting of the self-propelled device in the fourth example embodiment.

FIG. 22 is a diagram illustrating an example of movement destination resetting of the self-propelled device 10a-2 in the fourth example embodiment. The immediate movement destination 2a-1 is reset to 2a-1' on the basis of the movement direction of the self-propelled device 10a-2 and the position of second movement destination 2a-2. In addition, in this case, the self-propelled device can pass through the movement destinations 2a-1' and 2a-2 while continuing group movement by moving along the route 20-3.

With such a configuration and operation, even in a case where the direction of group movement and the location direction of an immediate movement destination are different from each other, the self-propelled device 10a-2 can reset the immediate movement destination in accordance with the locations of the second and subsequent movement destinations, and continue the group movement. That is, the self-propelled device 10a-2 can further increase efficiency in the movement of the self-propelled device.

In the present example embodiment, the movement destination resetting unit 18 resets the movement destinations to the movement direction of the self-propelled device 10a-2 and positions at which the self-propelled device 10a-2 can pass through the second and subsequent movement destinations. As a modification example, the movement destination resetting unit 18 may reset the movement destination of the self-propelled device 10a-2 on the extension line of the host device movement vector.

Hereinbefore, although the example embodiments of the present invention have been described in detail with reference to the accompanying drawings, specific configurations are not limited to those described above, and various design changes and the like can be made without departing from the scope of this invention. For example, a plurality of devices have each function included in the self-propelled device of the present invention, and the devices exchange information with each other, whereby the same function as that of the self-propelled device shown in the present invention may be achieved.

In addition, a program for realizing all or some of functions of a self-propelled device, a self-propelling method, and a self-propelling program in the present invention is recorded in a computer readable recording medium, and thus a process of each unit may be performed by causing a computer system to read and execute the program recorded in this recording medium. In addition, the term "computer system" referred to here is assumed to include an operating system (OS) and hardware such as peripheral devices.

In addition, the term "computer readable recording medium" refers to a magnetooptic disc, a ROM, a portable medium such as a non-volatile semiconductor memory, and a storage device such as a hard disk built into a computer system. Further, the "computer readable recording medium" is assumed to include recording mediums that dynamically hold a program during a short period of time like networks such as the Internet or communication lines when a program is transmitted through communication lines such as a telephone line, and recording mediums that hold a program for a certain period of time like a volatile memory inside a computer system serving as a server or a client in that case. In addition, the above-mentioned program may be a program which is used for realizing a portion of the aforementioned functions, and may be a program which is capable of realizing the aforementioned functions by a combination of programs previously recorded in the computer system.

Figure 23:
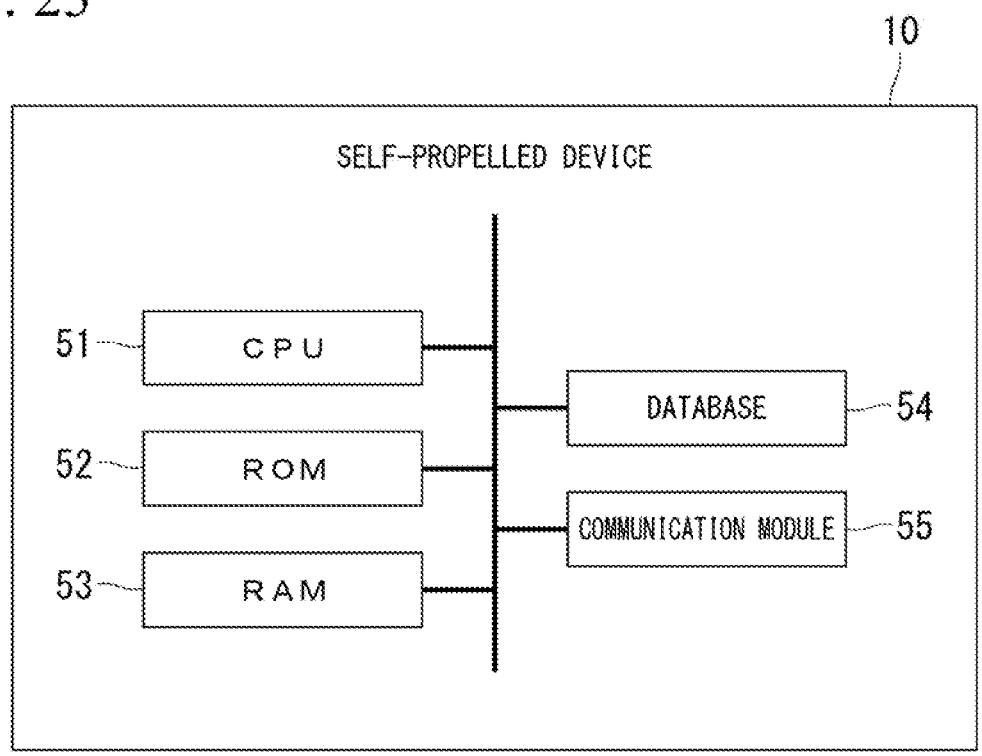
FIG. 23 is a hardware configuration diagram of a computer of the self-propelled device according to each example embodiment.

In addition, FIG. 23 shows an example of the hardware configuration of a computer for realizing the self-propelled device 10 in each example embodiment described above. As shown in this drawing, the self-propelled device 10 includes a computer having hardware such as a central processing unit (CPU) 51, a read only memory (ROM) 52, a random access memory (RAM) 53, a database 54, and a communication module 55. The self-propelled device 10 may further have hardware such as a traveling mechanism or a sensor.

Hereinbefore, although the example embodiments of the present invention have been described, the technical scope of the present invention is not limited to the scopes described in the above example embodiments. It is apparent to those skilled in the art that various changes or modifications can be added to the above-described example embodiments. The possibility of example embodiments to which such changes or modifications are added also being included in the technical scope of the present invention is obvious from the description of the scope of claims.

A portion or the entirety of the example embodiments described above may also be described as in the following supplementary notes, but there is no limitation thereto.

(Supplementary note 1) A self-propelled device including: a host device movement vector acquisition means that is configured to acquire a host device movement vector including: a movement speed of the self-propelled device; a distance information acquisition means that is configured to acquire nearby device distance information including a distance and a direction to the self-propelled device for each of nearby devices located near the self-propelled device; a nearby device movement vector acquisition means that is configured to acquire a nearby device movement vector including a movement speed and a movement direction of each of the nearby devices for each of the nearby devices; and a determination means that is configured to determine whether a group movement is possible or not for each of the nearby devices based on the nearby device distance information, the host device movement vector and the nearby device movement vector.

(Supplementary note 2) The self-propelled device according to supplementary note 1, further including a control means that, when there is a nearby device group constituted by one or more of the nearby devices determined that the group movement is possible by the determination means, controls the movement speed and the movement direction of the self-propelled device so as to approach the nearby device group and to gradually approach an average of movement vectors of the nearby device group after an approach.

(Supplementary note 3) The self-propelled device according to supplementary note 2, wherein the control means is further configured to control the movement speed and the movement direction of the self-propelled device such that the distance from each of the nearby devices exceeds a safety value which is a predetermined value.

(Supplementary note 4) The self-propelled device according to supplementary note 3, wherein the safety value is determined according to the movement speed of the self-propelled device.

(Supplementary note 5) The self-propelled device according to any one of supplementary notes 2 to 4, wherein the control means is configured to perform control to increase the movement speed of the self-propelled device in a case where a change in speed does not occur for a certain period of time.

(Supplementary note 6) The self-propelled device according to any one of supplementary notes 2 to 5, further including: a movement destination distance information acquisition means that is configured to acquire movement destination distance information including a distance and a direction to a movement destination of the self-propelled device; and a deviation degree calculation means that is configured to calculate a degree of deviation based on the host device movement vector and the movement destination distance information, wherein the determination means is further configured to determine that the group movement is not possible in a case where the degree of deviation calculated by the deviation degree calculation means exceeds a predetermined value relating to a group movement determination.

(Supplementary note 7) The self-propelled device according to supplementary note 6, wherein the control means is further configured to control the movement speed and the movement direction of the self-propelled device so as to gradually approach the movement destination in a case where it is determined that the group movement is not possible.

(Supplementary note 8) The self-propelled device according to supplementary note 6 or 7, further comprising a movement destination resetting means that is configured to reset the movement destination on an extension line of the host device movement vector when the degree of deviation calculated by the deviation degree calculation means exceeds a predetermined value relating to movement destination resetting.

(Supplementary note 9) The self-propelled device according to any one of supplementary notes 6 to 8, wherein the deviation degree calculation means is configured to calculate a difference in an angle between the movement direction of the self-propelled device acquired from the host device movement vector and the direction to the movement destination included in the movement destination distance information as the degree of deviation.

(Supplementary note 10) The self-propelled device according to supplementary note 9, wherein the deviation degree calculation means is further configured to correct and calculate the difference in the angle based on the movement destination distance information, the host device movement vector, and the movement characteristics of the self-propelled device.

(Supplementary note 11) The self-propelled device according to supplementary note 9 or 10, wherein the predetermined value relating to the group movement determination is determined as a difference in an angle when an increment of the movement distance calculated from the difference in the angle and a deemed decrement of a movement distance considering an increment of movement efficiency during the group movement are compared with each other, and both are balanced.

(Supplementary note 12) The self-propelled device according to according to any one of supplementary notes 1 to 11, wherein the determination means is configured to determine group movement to be possible for the nearby devices in which a distance from the self-propelled device included in the nearby device distance information falls below a predetermined value, a speed difference calculated from the host device movement vector and the nearby device movement vector falls below a predetermined value, and a difference in the movement direction calculated from the host device movement vector and the nearby device movement vector falls below a predetermined value.

(Supplementary note 13) The self-propelled device according to any one of supplementary notes 1 to 12, wherein the host device movement vector acquisition means is configured to use information relating to a prediction of a movement from a current location after a predetermined period of time as the host device movement vector.

(Supplementary note 14) A self-propelling method including: a step of acquiring a host device movement vector including a movement speed of a self-propelled device; a step of acquiring nearby device distance information including a distance and a direction to the self-propelled device for each of nearby devices located near the self-propelled device; a step of acquiring a nearby device movement vector including a movement speed and a movement direction of each of the nearby devices for each of the nearby devices; and a step of determining whether a group movement is possible or not for each of the nearby devices based on the nearby device distance information, the host device movement vector and the nearby device movement vector.

(Supplementary note 15) A recording medium that stores a program that causes a computer to execute: a step of acquiring a host device movement vector including a movement speed of a self-propelled device; a step of acquiring nearby device distance information including a distance and a direction to the self-propelled device for each of nearby devices located near the self-propelled device; a step of acquiring a nearby device movement vector including a movement speed and a movement direction of each of the nearby devices for each of the nearby devices; and a step of determining whether a group movement is possible or not for each of the nearby devices based on the nearby device distance information, the host device movement vector and the nearby device movement vector.

INDUSTRIAL APPLICABILITY

According to an aspect described above, it is possible to efficiently operate a self-propelled device relative to a nearby device.

REFERENCE SYMBOLS

1 Warehouse
2 Movement destination
2a-1 Movement destination
2a-1' Movement destination
2a-2 Movement destination
10 Self-propelled device
10a Self-propelled device
10a-1 Self-propelled device
10a-2 Self-propelled device
10b Self-propelled device
10c Self-propelled device
10d Self-propelled device
11 Host device movement vector acquisition unit
12 Distance information acquisition unit
13 Nearby device movement vector acquisition unit
14 Determination unit
14-1 Determination unit
14-2 Determination unit
15 Control unit
16 Movement destination distance information acquisition unit
17 Deviation degree calculation unit
18 Movement destination resetting unit
20 Route
20-1 Route
20-2 Route
20-3 Route
30 Predetermined range
51 CPU
52 ROM
53 RAM
54 Database
55 Communication module

The invention claimed is:
1. A self-propelled device comprising:
  a memory configured to store instructions; and
  a processor configured to execute the instructions to:
    acquire a host device movement vector including a movement speed and a movement direction of the self-propelled device;
    acquire first device distance information including a distance and a direction to the self-propelled device for each of first devices;
    acquire a first device movement vector including a movement speed and a movement direction of each of the first devices;
    determine, among the first devices, second devices based on the first device distance information, the host device movement vector and the first device movement vector, the second devices being capable of a group movement;
    compare a movement speed and a movement direction of a device group with the movement speed and the movement direction of the self-propelled device and determine whether the self-propelled device is capable of approaching the device group based on a result of the comparison, the device group being constituted by the second devices;

when it is determined that the self-propelled device is capable of approaching the device group, control the movement speed and the movement direction of the self-propelled device so that the self-propelled device approaches the device group;

control the movement speed and the movement direction of the self-propelled device so that the movement speed and the movement direction of the self-propelled device approach an average of movement vectors of the device group after the self-propelled device approaches the device group;

acquire movement destination distance information including a distance and a direction to a movement destination of the self-propelled device;

calculate a degree of deviation based on the host device movement vector and the movement destination distance information;

determine that the group movement is not possible in a case where the degree of deviation calculated exceeds a predetermined value relating to a group movement determination;

calculate a first angular difference between the movement direction of the self-propelled device acquired from the host device movement vector and the direction to the movement destination included in the movement destination distance information as the degree of deviation; and correct the first angular difference to a second angular difference based on the movement destination distance information, the host device movement vector, and movement characteristics of the self-propelled device, the second angular difference being an angular difference after a movement of the self-propelled device in a traveling direction only by a distance calculated from the host device movement vector and the movement characteristics of the self-propelled device.

2. The self-propelled device according to claim 1, wherein the processor is further configured to execute the instructions to control the movement speed and the movement direction of the self-propelled device such that the distance from each of the second devices exceeds a safety value which is a predetermined value.

3. The self-propelled device according to claim 2, wherein the safety value is determined according to the movement speed of the self-propelled device.

4. The self-propelled device according to claim 1, wherein the processor is configured to execute the instructions to perform control to increase the movement speed of the self-propelled device in a case where a change in the movement speed of the self-propelled device does not occur for a certain period of time.

5. The self-propelled device according to claim 1, wherein the processor is further configured to execute the instructions to control the movement speed and the movement direction of the self-propelled device so that the self-propelled device approaches the movement destination in a case where it is determined that the group movement is not possible.

6. The self-propelled device according to claim 1, wherein the processor is further configured to execute the instructions to set the movement destination to a position that is on an extension line of the host device movement vector when the degree of deviation calculated exceeds a predetermined value relating to movement destination setting.

7. The self-propelled device according to according to claim 1, wherein the processor is configured to execute the instructions to determine group movement to be possible for the first devices in which a distance from the self-propelled device included in the first device distance information falls below a predetermined value, a speed difference calculated from the host device movement vector and the first device movement vector falls below a predetermined value, and a difference in a movement direction calculated from the host device movement vector and the first device movement vector falls below a predetermined value.

8. The self-propelled device according to claim 1, wherein the processor is configured to execute the instructions to use information relating to a prediction of a movement from a current location after a predetermined period of time as the host device movement vector.

9. A self-propelling method performed by a processor, the method comprising:

acquiring a host device movement vector including a movement speed and a movement direction of the self-propelled device;

acquiring first device distance information including a distance and a direction to the self-propelled device for each of first devices;

acquiring a first device movement vector including a movement speed and a movement direction of each of the first devices;

determining, among the first devices, second devices based on the first device distance information, the host device movement vector and the first device movement vector, the second devices being capable of a group movement;

comparing a movement speed and a movement direction of a device group with the movement speed and the movement direction of the self-propelled device and determining whether the self-propelled device is capable of approaching the device group based on a result of the comparison, the device group being constituted by the second devices;

when it is determined that the self-propelled device is capable of approaching the device group, controlling the movement speed and the movement direction of the self-propelled device so that the self-propelled device approaches the second device group;

controlling the movement speed and the movement direction of the self-propelled device so that the movement speed and the movement direction of the self-propelled device approach an average of movement vectors of the device group after the self-propelled device approaches the device group;

acquiring movement destination distance information including a distance and a direction to a movement destination of the self-propelled device;

calculating a degree of deviation based on the host device movement vector and the movement destination distance information;

determining that the group movement is not possible in a case where the degree of deviation calculated exceeds a predetermined value relating to a group movement determination;

calculating a first angular difference between the movement direction of the self-propelled device acquired from the host device movement vector and the direction to the movement destination included in the movement destination distance information as the degree of deviation; and correcting the first angular difference to a second angular difference based on the movement destination distance information, the host device movement vector, and movement characteristics of the self-propelled device, the second angular difference being an angular difference after a movement of the self-propelled device in a traveling direction only by a distance calculated from the host device movement vector and the movement characteristics of the self-propelled device.

10. A non-transitory computer-readable recording medium that stores a program that causes a computer to execute:
- acquiring a host device movement vector including a movement speed and a movement direction of a self-propelled device;
- acquiring first device distance information including a distance and a direction to the self-propelled device for each of first devices;
- acquiring a first device movement vector including a movement speed and a movement direction of each of the first devices;
- determining, among the first devices, second devices based on the first device distance information, the host device movement vector and the first device movement vector, the second devices being capable of a group movement;
- comparing a movement speed and a movement direction of a device group with the movement speed and the movement direction of the self-propelled device and determine whether the self-propelled device is capable of approaching the device group based on a result of the comparison, the device group being constituted by the second devices;
- when it is determined that the self-propelled device is capable of approaching the device group, controlling the movement speed and the movement direction of the self-propelled device so that the self-propelled device approaches the second device group;
- controlling the movement speed and the movement direction of the self-propelled device so that the movement speed and the movement direction of the self-propelled device approach an average of movement vectors of the device group after the self-propelled device approaches the device group;
- acquiring movement destination distance information including a distance and a direction to a movement destination of the self-propelled device;
- calculating a degree of deviation based on the host device movement vector and the movement destination distance information;
- determining that the group movement is not possible in a case where the degree of deviation calculated exceeds a predetermined value relating to a group movement determination;
- calculating a first angular difference between the movement direction of the self-propelled device acquired from the host device movement vector and the direction to the movement destination included in the movement destination distance information as the degree of deviation; and
- correcting the first angular difference to a second angular difference based on the movement destination distance information, the host device movement vector, and movement characteristics of the self-propelled device, the second angular difference being an angular difference after a movement of the self-propelled device in a traveling direction only by a distance calculated from the host device movement vector and the movement characteristics of the self-propelled device.

* * * * *